United States Patent
Lu et al.

(10) Patent No.: US 12,143,938 B2
(45) Date of Patent: Nov. 12, 2024

(54) RADIO FREQUENCY (RF) EXPOSURE COMPLIANCE

(71) Applicant: QUALCOMM Incorporated, San Diego, CA (US)

(72) Inventors: Lin Lu, San Diego, CA (US); Jagadish Nadakuduti, Mission Viejo, CA (US); Paul Guckian, La Jolla, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/454,614

(22) Filed: Nov. 11, 2021

(65) Prior Publication Data

US 2022/0159582 A1    May 19, 2022

Related U.S. Application Data

(60) Provisional application No. 63/175,464, filed on Apr. 15, 2021, provisional application No. 63/152,773, (Continued)

(51) Int. Cl.
*H04W 52/22* (2009.01)
*H04W 52/28* (2009.01)
*H04W 52/36* (2009.01)

(52) U.S. Cl.
CPC ....... *H04W 52/225* (2013.01); *H04W 52/228* (2013.01); *H04W 52/285* (2013.01); *H04W 52/36* (2013.01)

(58) Field of Classification Search
CPC ............ H04W 52/225; H04W 52/228; H04W 52/285; H04W 52/36; H04W 52/367; H04W 52/146; H04W 88/02; H04W 52/248; H04W 52/262; H04W 52/223; H04W 52/38; H04W 52/245;
(Continued)

(56) References Cited

U.S. PATENT DOCUMENTS 5,524,275 A * 6/1996 Lindell ............... H04W 52/367
 455/127.1
8,995,938 B2 * 3/2015 Ali ....................... H04B 1/3838
 455/127.1

(Continued)

FOREIGN PATENT DOCUMENTS

EP         2410661 A1      1/2012

OTHER PUBLICATIONS

International Search Report and Written Opinion—PCT/US2021/072378—ISA/EPO—Mar. 11, 2022.

*Primary Examiner* — Lana N Le
(74) *Attorney, Agent, or Firm* — Patterson & Sheridan LLP/Qualcomm Incorporated

(57) ABSTRACT

Certain aspects of the present disclosure provide techniques and apparatus for determining a transmit power based on a pattern and/or future conditions for a transmission while maintaining radio frequency (RF) exposure compliance. An example method generally includes obtaining a pattern associated with one or more first transmissions, determining a transmit power for one or more second transmissions based at least in part on the pattern and an RF exposure limit, and transmitting the one or more second transmissions at the determined transmit power.

16 Claims, 12 Drawing Sheets

Related U.S. Application Data filed on Feb. 23, 2021, provisional application No. 63/141,834, filed on Jan. 26, 2021, provisional application No. 63/113,488, filed on Nov. 13, 2020.

(58) Field of Classification Search
CPC .. H04W 52/0258; H04W 52/24; Y02D 30/70; H04B 1/3838
See application file for complete search history.

(56) References Cited

U.S. PATENT DOCUMENTS

| | | |
|---|---|---|
| 9,622,187 B2 | 4/2017 | Logan et al. |
| 10,447,413 B1* | 10/2019 | Nadakuduti ......... H04B 1/3838 |
| 2003/0012222 A1* | 1/2003 | Rinchiuso ............... H04L 1/188 |
| | | 370/468 |
| 2004/0142715 A1 | 7/2004 | Oses |
| 2008/0119181 A1* | 5/2008 | Suzuki .............. H04W 72/1268 |
| | | 455/422.1 |
| 2013/0022028 A1* | 1/2013 | Niwano .............. H04W 52/146 |
| | | 370/335 |
| 2014/0376430 A1 | 12/2014 | Su et al. |
| 2020/0015171 A1 | 1/2020 | Nadakuduti et al. |
| 2020/0358589 A1 | 11/2020 | Youtz et al. |
| 2022/0159581 A1 | 5/2022 | Lu |
| 2024/0196344 A1* | 6/2024 | Aagiru ................ H04W 52/225 |

* cited by examiner

RADIO FREQUENCY (RF) EXPOSURE COMPLIANCE

CROSS-REFERENCE TO RELATED APPLICATIONS

The present application for patent claims priority to U.S. Provisional Application No. 63/113,488, filed Nov. 13, 2020; U.S. Provisional Application No. 63/141,834, filed Jan. 26, 2021; U.S. Provisional Application No. 63/152,773, filed Feb. 23, 2021; and U.S. Provisional Application No. 63/175,464, filed Apr. 15, 2021, each of which is hereby expressly incorporated by reference herein in its entirety.

BACKGROUND

Field of the Disclosure

Aspects of the present disclosure relate to wireless communications, and more particularly, to determining a transmit power while maintaining radio frequency (RF) exposure compliance.

Description of Related Art

Wireless communication systems are widely deployed to provide various telecommunication services such as telephony, video, data, messaging, broadcasts, etc. Modern wireless communication devices (such as cellular telephones) are generally mandated to meet radio frequency (RF) exposure limits set by domestic and international standards and regulations. To ensure compliance with the standards, such devices currently undergo an extensive certification process prior to being shipped to market. To ensure that a wireless communication device complies with an RF exposure limit, techniques have been developed to enable the wireless communication device to assess RF exposure from the wireless communication device and adjust the transmission power of the wireless communication device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable transmit powers in compliance with radio frequency (RF) exposure limits.

Certain aspects of the subject matter described in this disclosure can be implemented in a method of wireless communication by a user equipment (UE). The method generally includes obtaining a pattern associated with one or more first transmissions; determining a transmit power for one or more second transmissions based at least in part on the pattern and an RF exposure limit; and transmitting the one or more second transmissions at the determined transmit power.

Certain aspects of the subject matter described in this disclosure can be implemented in an apparatus for wireless communication. The apparatus generally includes a memory, a processor, and a transmitter. The processor is coupled to the memory, such that the processor and the memory are configured to obtain a pattern associated with one or more first transmissions, and determine a transmit power for one or more second transmissions based at least in part on the pattern and an RF exposure limit; and a transmitter configured to transmit the one or more second transmissions at the determined transmit power.

Certain aspects of the subject matter described in this disclosure can be implemented in an apparatus for wireless communication. The apparatus generally includes means for obtaining a pattern associated with one or more first transmissions; means for determining a transmit power for one or more second transmissions based at least in part on the pattern and an RF exposure limit; and means for transmitting the one or more second transmissions at the determined transmit power.

Certain aspects of the subject matter described in this disclosure can be implemented in a computer-readable medium having instructions stored thereon for obtaining a pattern associated with one or more first transmissions; determining a transmit power for one or more second transmissions based at least in part on the pattern and an RF exposure limit; and transmitting the one or more second transmissions at the determined transmit power.

Certain aspects of the subject matter described in this disclosure can be implemented in an apparatus for wireless communication. The apparatus generally includes a memory and a processor coupled to the memory. The processor and the memory are configured to obtain a pattern associated with one or more first transmissions, determine a transmit power for one or more second transmissions based at least in part on the pattern and a radio frequency (RF) exposure limit, and transmit the one or more second transmissions at the determined transmit power.

Certain aspects of the subject matter described in this disclosure can be implemented in an apparatus for wireless communication. The apparatus generally includes a memory and a processor coupled to the memory. The processor and the memory are configured to obtain data for a transmission to a receiving entity and radio conditions associated with the transmission, determine a transmit time associated with the data based at least in part on the radio conditions, and transmit, to the receiving entity, a signal indicative of the data at a transmit power based at least in part on the determined transmit time and a radio frequency (RF) exposure limit.

Certain aspects of the subject matter described in this disclosure can be implemented in an apparatus for wireless communication. The apparatus generally includes a memory and a processor coupled to the memory. The processor and the memory are configured to select a transmission mode from a plurality of transmission modes based on data for a transmission from the apparatus to a receiving entity and one or more radio conditions associated with the transmission, and transmit, to the receiving entity, a signal indicative of the data at a transmit power based at least in part on the selected transmission mode and a radio frequency (RF) exposure limit.

Certain aspects of the subject matter described in this disclosure can be implemented in an apparatus for wireless communication. The apparatus generally includes obtaining data for a transmission to a receiving entity and radio conditions associated with the transmission; determining a transmit time associated with the data based at least in part on the radio conditions; and transmitting, to the receiving entity, a signal indicative of the data at a transmit power based at least in part on the determined transmit time and a radio frequency (RF) exposure limit.

Certain aspects of the subject matter described in this disclosure can be implemented in an apparatus for wireless communication. The apparatus generally includes selecting a transmission mode from a plurality of transmission modes based on data for a transmission from the wireless device to a receiving entity and one or more radio conditions associated with the transmission; and transmitting, to the receiving entity, a signal indicative of the data at a transmit power based at least in part on the selected transmission mode and a radio frequency (RF) exposure limit.

Certain aspects of the subject matter described in this disclosure can be implemented in a computer-readable medium having instructions stored thereon for obtaining data for a transmission to a receiving entity and radio conditions associated with the transmission; determining a transmit time associated with the data based at least in part on the radio conditions; and transmitting, to the receiving entity, a signal indicative of the data at a transmit power based at least in part on the determined transmit time and a radio frequency (RF) exposure limit.

Certain aspects of the subject matter described in this disclosure can be implemented in a computer-readable medium having instructions stored thereon for selecting a transmission mode from a plurality of transmission modes based on data for a transmission from the wireless device to a receiving entity and one or more radio conditions associated with the transmission; and transmitting, to the receiving entity, a signal indicative of the data at a transmit power based at least in part on the selected transmission mode and a radio frequency (RF) exposure limit.

Certain aspects of the subject matter described in this disclosure can be implemented in a method of wireless communication by a wireless device. The method generally includes obtaining data for a transmission to a receiving entity and radio conditions associated with the transmission; determining a transmit time associated with the data based at least in part on the radio conditions; and transmitting, to the receiving entity, a signal indicative of the data at a transmit power based at least in part on the determined transmit time and a radio frequency (RF) exposure limit.

Certain aspects of the subject matter described in this disclosure can be implemented in a method of wireless communication by a wireless device. The method generally includes selecting a transmission mode from a plurality of transmission modes based on data for a transmission from the wireless device to a receiving entity and one or more radio conditions associated with the transmission; and transmitting, to the receiving entity, a signal indicative of the data at a transmit power based at least in part on the selected transmission mode and a radio frequency (RF) exposure limit.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
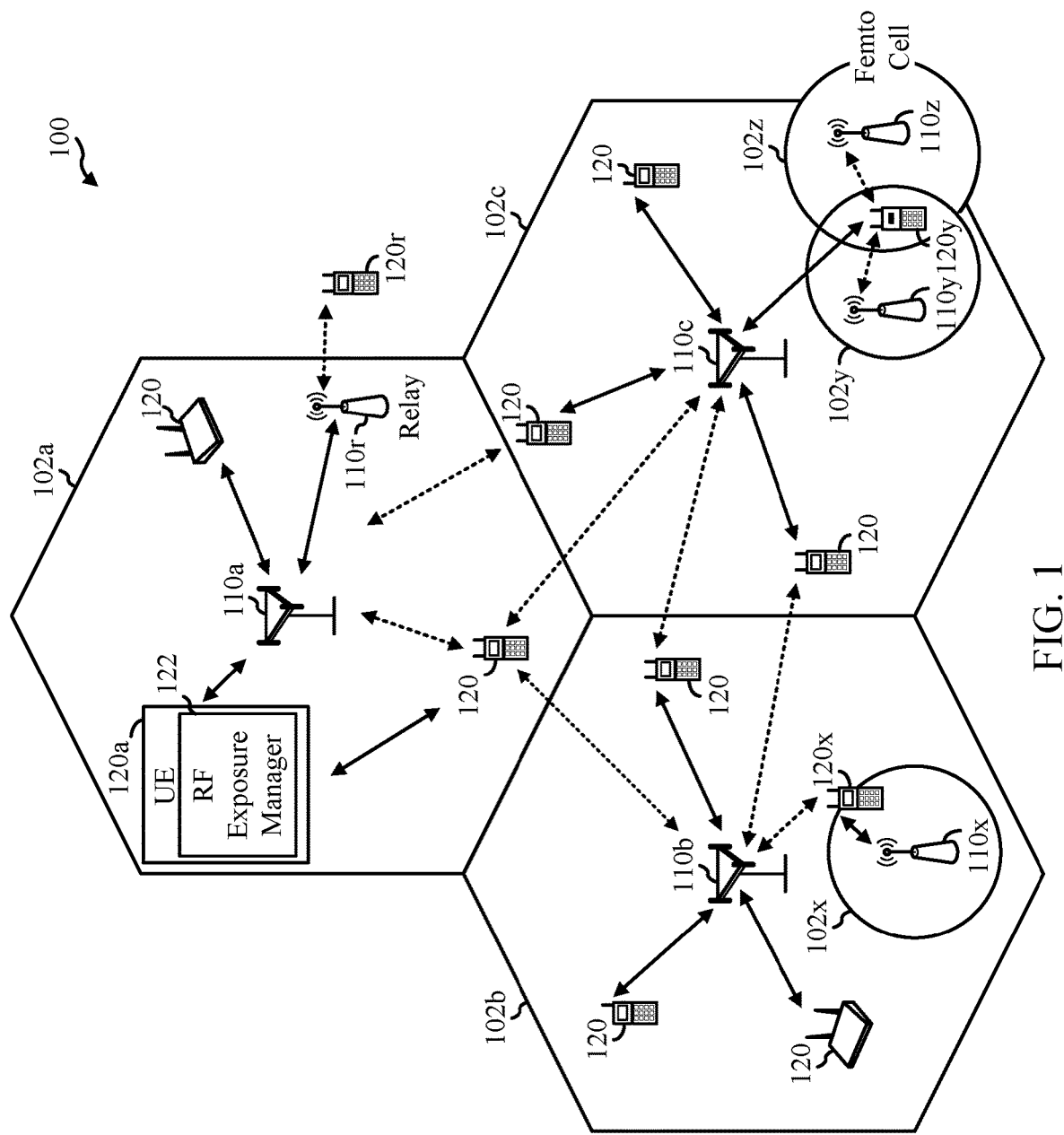
FIG. 1 is a block diagram conceptually illustrating an example wireless communication network, in accordance with certain aspects of the present disclosure.
Figure 1:
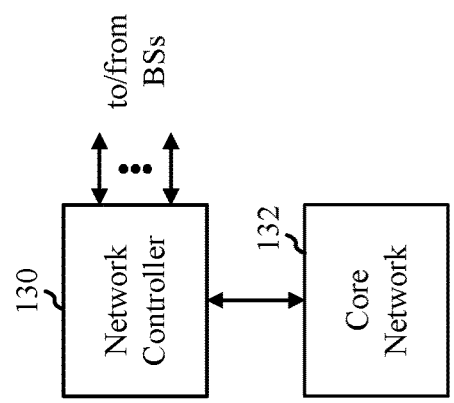

Aspects of the present disclosure provide apparatus, methods, processing systems, and computer-readable mediums for ensuring radio frequency (RF) exposure compliance based on one or more patterns and/or future conditions.

In certain cases, time-averaging of RF exposure may be performed to be in compliance with the RF exposure limit within a specified time window. Multi-mode/multi-band wireless communication devices have multiple transmit antennas, which may be configured to simultaneously transmit in one or more sub-6 GHz bands and/or one or more bands greater than 6 GHz, such as mmWave (e.g., FR2) or FR3 bands. As described herein, the RF exposure of sub-6 GHz bands may be evaluated in terms of specific absorption rate (SAR), whereas the RF exposure of bands greater than 6 GHz may be evaluated in terms of power density (PD). Due to the regulations on simultaneous exposure, the wireless communication device may limit maximum transmit power for sub-6 GHz bands and/or bands greater than 6 GHz.

Aspects of the present disclosure provide enhanced techniques for ensuring RF exposure compliance, for example, based on one or more patterns and/or future conditions. The patterns may include a transmit power pattern (e.g., the instantaneous transmission power as a function of time) associated with past transmissions over the course of various time periods (such as the past few minutes, hour(s), or day(s)) and/or an application pattern indicative of the periodic bursts of traffic that an application (e.g., a voice or video call application) may generate. In certain aspects, the pattern may be used to identify when an upcoming transmission will occur, and the pattern may be correlated to various characteristics associated with the upcoming transmission, such as transmit times, transmit power over time, antenna switching, network conditions, sensor information, etc.

As an example, if the pattern indicates that the transmit time of the upcoming transmission is likely to be relatively long (e.g., the transmit time is greater than the time window associated with the RF exposure limit) and/or that a consistent uplink transmission is likely to be maintained over the time window, then the transmitter may allocate a lower power level (e.g., $P_{limit}$ where $P_{limit} < P_{max}$) to the upcoming transmission. If the pattern indicates that the transmit time of the upcoming transmission is likely to be relatively short (e.g., the transmit time is less than the time window associated with the RF exposure limit) and/or that transmission is likely to be non-continuous (e.g., bursts and/or gaps are likely), then the transmitter may allocate a higher instantaneous power (e.g., higher than $P_{limit}$) to the upcoming transmission in compliance with the RF exposure limit.

In certain aspects, the UE may consider future conditions (such as transmit time and/or radio conditions) in determining the transmit power for RF exposure compliance. Aspects of the present disclosure provide techniques and apparatus for switching between various transmission modes (e.g., as described herein) based on a transmit time associated with data and/or radio conditions while ensuring RF exposure compliance. In certain aspects, the transmit time may be derived from a size (e.g., a data buffer size) associated with the data and a current data rate. As an example, if the data buffer size is large (e.g., the transmit time is greater than the time window associated with the RF exposure limit), then the transmitter may operate in a peak mode to enable continuous transmission at the maximum average power level (e.g., $P_{limit}$). If the data buffer size is small (e.g., the transmit time is less than the time window associated with the RF exposure limit), then the transmitter may operate in a time-average mode and transmit at the maximum power to complete the transmission if a reserve power margin is sufficient for high power transmission. The transmit time may be determined based on the data buffer size and the radio conditions. For example, a signal or communications environment may limit or be indicative of a throughput or amount of data which can be transmitted at an instantaneous time or over a certain upcoming amount of time. In some aspects, the determined transmit time may be based on actual or measured values. For example, the radio conditions may be determined based on a measured RSRP. In some aspects, the determined transmit time may be based on predicted values, for example based on one or more patterns. For example, the radio conditions may be determined based on path loss a user is likely to experience at a time of day or in a certain location as indicated by a pattern.

The various techniques described herein for ensuring RF exposure compliance may enable desirable transmit powers for data transmissions. The desirable transmit power may provide desirable uplink/sidelink performance, such as desirable data rates, carrier aggregation, and/or a connection at the edge of a cell.

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may have specific latency and reliability settings. These services may also have different transmission time intervals (TTIs) to meet respective quality of service (QoS) settings. In addition, these services may coexist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. As shown in FIG. 1, the UE 120a includes an RF exposure manager 122 that determines transmit powers for transmissions to a receiving entity (such as BS 110a or another UE 120) based on various patterns and/or future conditions, in accordance with aspects of the present disclosure. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relay transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Another wireless device in the wireless communication network 100 may alternatively or additionally include an RF exposure manager. For example, one or more of the BSs 110 may be configured as a customer premises equipment (CPE), and an RF exposure manager configured as described herein may be implemented in a BS or CPE.

Figure 2:
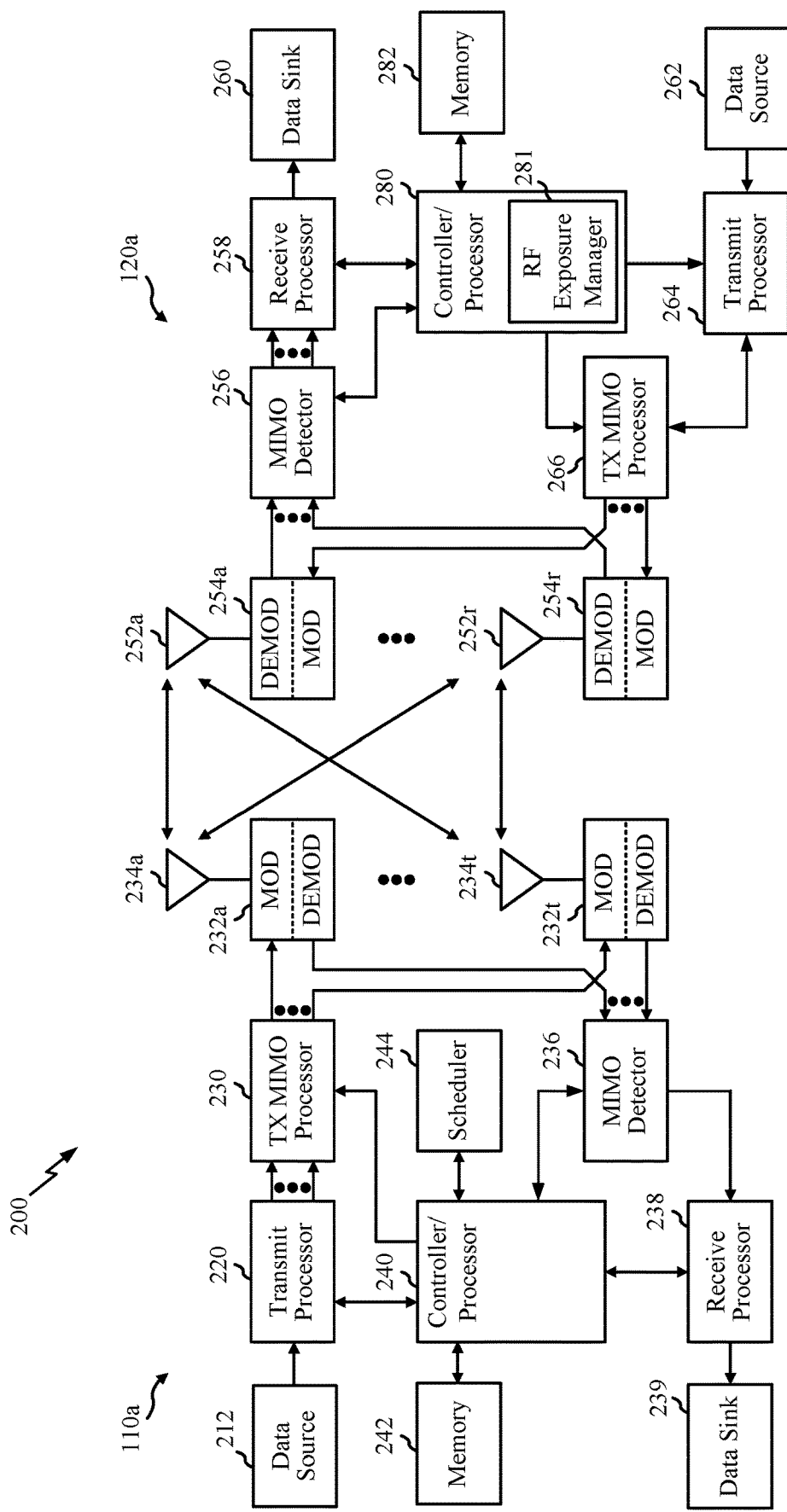
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in the transceivers 232a-232t may process a respective output symbol stream (e.g., for OFDM, etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each of the transceivers 254a-254r may condition (e.g., filter, amplify, downconvert, and digitize) a respective received signal to obtain input samples. Each demodulator in transceivers 254a-254r may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) and other components in transceivers 254a-254r (e.g., for SC-FDM, etc.), and transmitted to the BS 110a. At the BS 110a, the uplink signals from the UE 120a may be received by the antennas 234, processed by the modulators and other components in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that determines transmit powers for transmissions to a receiving entity (such as BS 110a) based on various patterns and/or future conditions, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above is an example of another UE 120.

Example RF Transceiver

Figure 3:
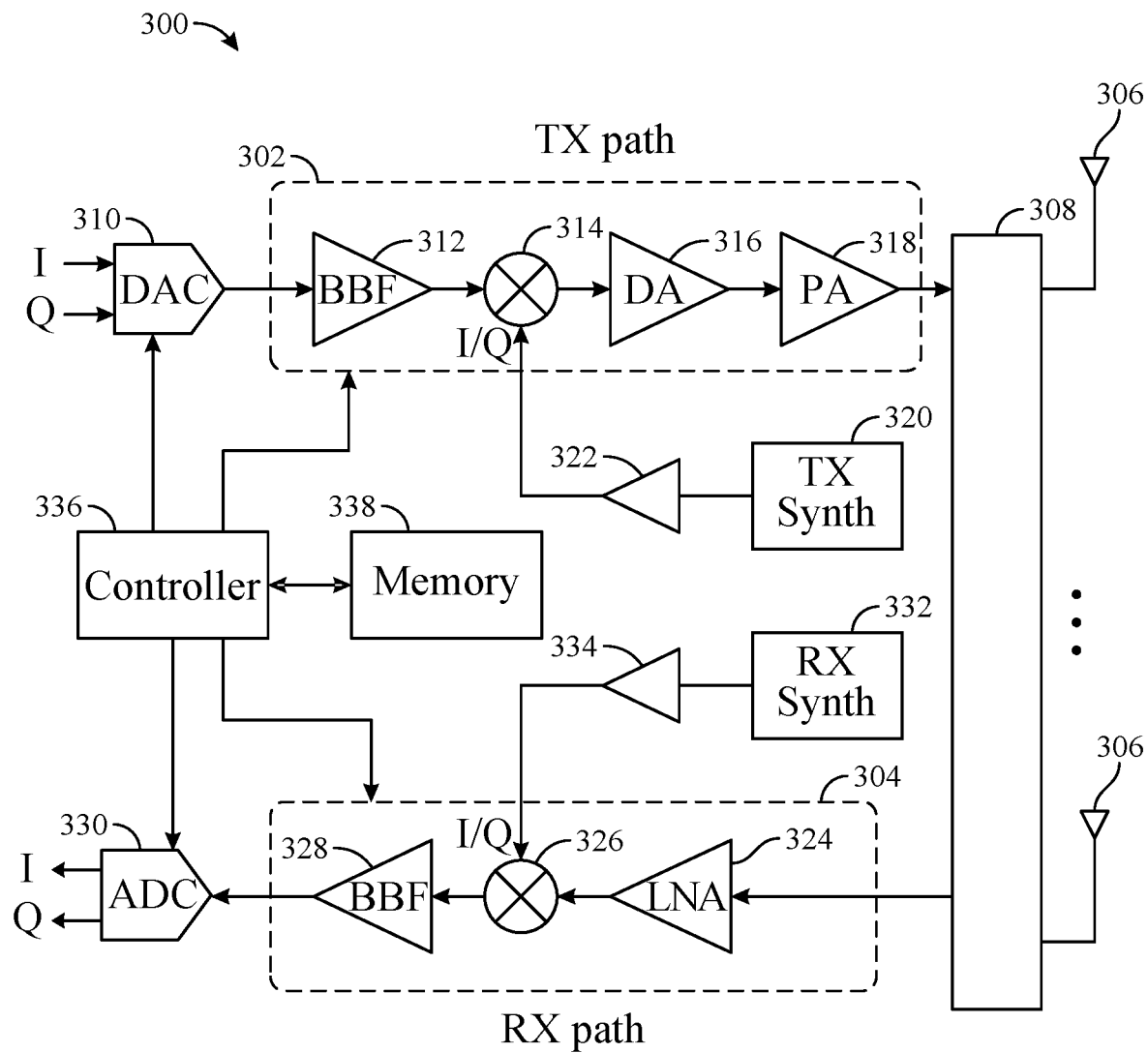
FIG. 3 is a block diagram of an example radio frequency (RF) transceiver, in accordance with certain aspects of the present disclosure.

FIG. 3 is a block diagram of an example RF transceiver circuit 300, which may be used in any of the wireless devices described above, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Some systems may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine time-averaged RF exposure measurements based on transmission power levels applied to the TX path 302 (e.g., certain levels of gain at the PA 318) to set a transmit power level that complies with an RF exposure limit set by domestic/foreign regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm². In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter (W/m²) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 10 GHz, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

To assess RF exposure from transmissions using the first technology (e.g., 3G, 4G, 5G in sub-6 GHz bands, IEEE 802.11ac, etc.), the wireless communication device may include multiple SAR distributions for the first technology stored in memory (e.g., memory 282 of FIG. 2 or memory 338 of FIG. 3). Each of the SAR distributions may correspond to a respective one of multiple transmit scenarios supported by the wireless communication device for the first technology. The transmit scenarios may correspond to various combinations of antennas (e.g., antennas 252a through 252r of FIG. 2 or antenna 306 of FIG. 3), frequency bands, channels and/or body positions, as discussed further below. In some examples, one or more of the SAR distributions include a single value (e.g., a peak value determined based on the description below, or a sum of peak values).

The SAR distribution (also referred to as a SAR map) for each transmit scenario may be generated based on measurements (e.g., E-field measurements) performed in a test laboratory using a model of a human body. After the SAR distributions are generated, the SAR distributions are stored in the memory to enable a processor (e.g., processor 280 of FIG. 2 or controller 336 of FIG. 3) to assess RF exposure in real time, as discussed further below. Each SAR distribution may include a set of SAR values, where each SAR value may correspond to a different location (e.g., on the model of the human body). Each SAR value may comprise a SAR value averaged over a mass of 1 g or 10 g at the respective location.

The SAR values in each SAR distribution correspond to a particular transmission power level (e.g., the transmission power level at which the SAR values were measured in the test laboratory). Since SAR scales with transmission power level, the processor may scale a SAR distribution for any transmission power level by multiplying each SAR value in the SAR distribution by the following transmission power scaler:

$$\frac{Tx_c}{Tx_{SAR}} \quad (1)$$

where $Tx_c$ is a current transmission power level for the respective transmit scenario, and $Tx_{SAR}$ is the transmission power level corresponding to the SAR values in the stored SAR distribution (e.g., the transmission power level at which the SAR values were measured in the test laboratory).

As discussed above, the wireless communication device may support multiple transmit scenarios for the first technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas to generate a SAR distribution for each one of the antennas. In this example, a SAR distribution for a transmit scenario in which two or more of the antennas are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

In certain aspects, a SAR distribution may be normalized with respect to a SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory may be normalized with respect to a SAR limit.

In certain aspects, the normalized SAR distribution for a transmit scenario may be generated by combining two or more normalized SAR distributions. For example, a normalized SAR distribution for a transmit scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \quad (2)$$

where $SAR_{lim}$ is a SAR limit, $SAR_{norm\_combined}$ is the combined normalized SAR distribution for simultaneous transmission from the active antennas, i is an index for the active antennas, $SAR_i$ is the SAR distribution for the $i^{th}$ active antenna, $Tx_i$ is the transmission power level for the $i^{th}$ active antenna, $Tx_{SAR1}$ is the transmission power level for the SAR distribution for the $i^{th}$ active antenna, and K is the number of the active antennas.

Equation (2) may be rewritten as follows:

$$SAR_{norm\_combined} = \sum_{i=1}^{i=K} \frac{Tx_i}{Tx_{SARi}} \cdot SAR_{norm\_i} \quad (3a)$$

where $SAR_{norm\_i}$ is the normalized SAR distribution for the $i^{th}$ active antenna. In the case of simultaneous transmissions using multiple active antennas at the same transmitting frequency (e.g., multiple in multiple out (MIMO)), the combined normalized SAR distribution is obtained by summing the square root of the individual normalized SAR distributions and computing the square of the sum, as given by the following:

$$SAR_{norm\_combined\_MIMO} = \left[ \sum_{i=1}^{i=K} \sqrt{\frac{Tx_i}{Tx_{SARi}} SAR_{norm\_i}} \right]^2 . \quad (3b)$$

In another example, normalized SAR distributions for different frequency bands may be stored in the memory. In this example, a normalized SAR distribution for a transmit scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using Equation (3a) in which i is an index for the active frequency bands, $SAR_{norm\_i}$ is the normalized SAR distribution for the $i^{th}$ active frequency band, $Tx_i$ is the transmission power level for the $i^{th}$ active frequency band, and $Tx_{SARi}$ is the transmission power level for the normalized SAR distribution for the $i^{th}$ active frequency band.

To assess RF exposure from transmissions using the second technology (e.g., 5G in 24 to 60 GHz bands, IEEE 802.11ad, 802.11ay, etc.), the wireless communication device may include multiple PD distributions for the second technology stored in the memory (e.g., memory 282 of FIG. 2 or memory 338 of FIG. 3). Each of the PD distributions may correspond to a respective one of multiple transmit scenarios supported by the wireless communication device for the second technology. The transmit scenarios may correspond to various combinations of antennas (e.g., antennas 252a through 252r of FIG. 2 or antenna 306 of FIG. 3), frequency bands, channels and/or body positions, as discussed further below. In some examples, one or more of the PD distributions include a single value (e.g., a peak value determined based on the description below, or a sum of peak values).

The PD distribution (also referred to as PD map) for each transmit scenario may be generated based on measurements (e.g., E-field measurements) performed in a test laboratory using a model of a human body. After the PD distributions are generated, the PD distributions are stored in the memory to enable the processor (e.g., processor 280 of FIG. 2 or controller 336 of FIG. 3) to assess RF exposure in real time, as discussed further below. Each PD distribution may include a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor may scale a PD distribution for any transmission power level by multiplying each PD value in the PD distribution by the following transmission power scaler:

$$\frac{Tx_c}{Tx_{PD}} \quad (4)$$

where $Tx_c$ is a current transmission power level for the respective transmit scenario, and $Tx_{PD}$ is the transmission power level corresponding to the PD values in the PD distribution (e.g., the transmission power level at which the PD values were measured in the test laboratory).

As discussed above, the wireless communication device may support multiple transmit scenarios for the second technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas to generate a PD distribution for each one of the antennas. In this example, a PD distribution for a transmit scenario in which two or more of the antennas are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one. In these aspects, each of the PD distributions stored in the memory may be normalized with respect to a PD limit.

In certain aspects, the normalized PD distribution for a transmit scenario may be generated by combining two or more normalized PD distributions. For example, a normalized PD distribution for a transmit scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{i=1}^{i=L} \frac{Tx_i}{Tx_{PDi}} \cdot \frac{PD_i}{PD_{lim}} \quad (5)$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $TxPD_i$ is the transmission power level for the PD distribution for the $i^{th}$ active antenna, and L is the number of the active antennas.

Equation (5) may be rewritten as follows:

$$PD_{norm\_combined} = \sum_{i=1}^{i=L} \frac{Tx_i}{Tx_{PDi}} \cdot PD_{norm\_i} \quad (6a)$$

where $PD_{norm\_i}$ is the normalized PD distribution for the $i^{th}$ active antenna. In the case of simultaneous transmissions using multiple active antennas at the same transmitting frequency (e.g., MIMO), the combined normalized PD distribution is obtained by summing the square root of the individual normalized PD distributions and computing the square of the sum, as given by the following:

$$PD_{norm\_combined\_MIMO} = \left[ \sum_{i=1}^{i=L} \sqrt{\frac{Tx_i}{Tx_{PDi}} \cdot PD_{norm\_i}} \right]^2 \quad (6b)$$

In another example, normalized PD distributions for different frequency bands may be stored in the memory. In this example, a normalized PD distribution for a transmit scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using Equation (6a) in which i is an index for the active frequency bands, $PD_{norm\_i}$ is the normalized PD distribution for the $i^{th}$ active frequency band, $Tx_i$ is the transmission power level for the $i^{th}$ active frequency band, and $Tx_{PDi}$ is the transmission power level for the normalized PD distribution for the $i^{th}$ active frequency band.

As discussed above, the UE 120 may simultaneously transmit signals using the first technology (e.g., 3G, 4G, IEEE 802.11ac, etc.) and the second technology (e.g., 5G, IEEE 802.11ad, etc.), in which RF exposure is measured using different metrics for the first technology and the second technology (e.g., SAR for the first technology and PD for the second technology). In this case, the processor 280 may determine a first maximum allowable power level for the first technology and a second maximum allowable power level for the second technology for transmissions in a future time slot that comply with RF exposure limits. During the future time slot, the transmission power levels for the first and second technologies are constrained (i.e., bounded) by the determined first and second maximum allowable power levels, respectively, to ensure compliance with RF exposure limits, as further below. In the present disclosure, the term "maximum allowable power level" refers to a "maximum allowable power level" imposed by an RF exposure limit unless stated otherwise. It is to be appreciated that the "maximum allowable power level" is not necessarily equal to the absolute maximum power level that complies with an RF exposure limit and may be less than the absolute maximum power level that complies with the RF exposure limit (e.g., to provide a safety margin). The "maximum allowable power level" may be used to set a power level limit on a transmission at a transmitter such that the power level of the transmission is not allowed to exceed the "maximum allowable power level" to ensure RF exposure compliance.

The processor 280 may determine the first and second maximum allowable power levels as follows. The processor may determine a normalized SAR distribution for the first technology at a first transmission power level, determine a normalized PD distribution for the second technology at a second transmission power level, and combine the normalized SAR distribution and the normalized PD distribution to generate a combined normalized RF exposure distribution (referred to simply as a combined normalized distribution below). The value at each location in the combined normalized distribution may be determined by combining the normalized SAR value at the location with the normalized PD value at the location or another technique.

The processor 280 may then determine whether the first and second transmission power levels comply with RF exposure limits by comparing the peak value in the combined normalized distribution with one. If the peak value is equal to or less than one (i.e., satisfies the condition 1), then the processor 280 may determine that the first and second transmission power levels comply with RF exposure limits (e.g., SAR limit and PD limit) and use the first and second transmission power levels as the first and second maximum allowable power levels, respectively, during the future time slot. If the peak value is greater than one, then the processor 280 may determine that the first and second transmission power levels do not comply with RF exposure limits. The condition for RF exposure compliance for simultaneous transmissions using the first and second technologies may be given by:

$$SAR_{norm} + PD_{norm} \leq 1 \qquad (7).$$

Figure 4:
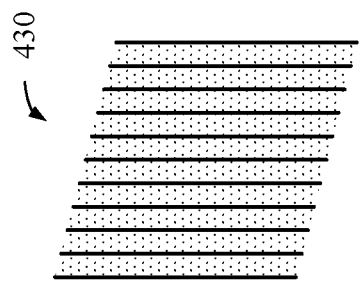
FIG. 4 is a diagram illustrating an example of a normalized specific absorption rate (SAR) distribution combined with a normalized power density (PD) distribution, in accordance with certain aspects of the present disclosure.
Figure 4:
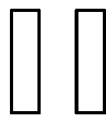
Figure 4:
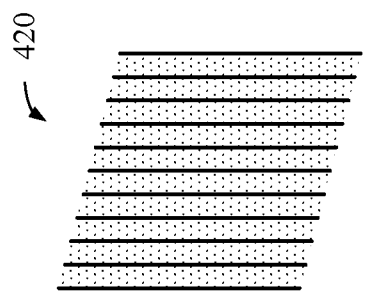
Figure 4:
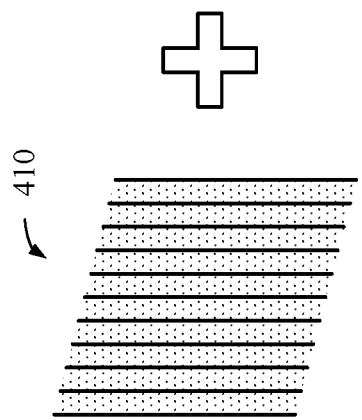

FIG. 4 is a diagram illustrating the normalized SAR distribution 410 and the normalized PD distribution 420, in which the normalized SAR distribution 410 and the normalized PD distribution 420 are combined to generate a combined normalized distribution 430. FIG. 4 also shows the condition that the peak value in the combined normalized distribution 430 be equal to or less than one for RF exposure compliance. Although each of the distributions 410, 420, and 430 is depicted as a two-dimensional distribution in FIG. 4, it is to be appreciated that the present disclosure is not limited to this example.

The normalized SAR distribution in Equation (7) may be generated by combining two or more normalized SAR distributions as discussed above (e.g., for a transmit scenario using multiple active antennas). Similarly, the normalized PD distribution in Equation (7) may be generated by combining two or more normalized PD distributions as discussed above (e.g., for a transmit scenario using multiple active antennas). In this case, the condition for RF exposure compliance in Equation (7) may be rewritten using Equations (3a) and (6a) as follows:

$$\sum_{i=1}^{i=K} \frac{Tx_i}{Tx_{SARi}} \cdot SAR_{norm\_i} + \sum_{i=1}^{i=L} \frac{Tx_i}{Tx_{PDi}} \cdot PD_{norm\_i} \leq 1. \qquad (8)$$

For the MIMO case, Equations (3b) and (6b) may be combined instead. As shown in Equation (8), the combined normalized distribution may be a function of transmission power levels for the first technology and transmission power levels for the second technology. All the points in the combined normalized distribution may meet the normalized limit of one in Equation (8). Additionally, when combining SAR and PD distributions, the SAR and PD distributions may be aligned spatially or aligned with their peak locations so that the combined distribution given by Equation (8) represents combined RF exposure for a given position of a human body.

In certain cases, the transmitter may ensure RF exposure compliance by operating under one of the following example schemes: (a) "a reserve-less time-average mode" without a reserve margin that allows for dropped connections during the time window, (b) "a peak mode" as described herein with respect to FIG. 5B, or (c) "a time-average mode," as described herein with respect to FIG. 5C.

Figure 5A:
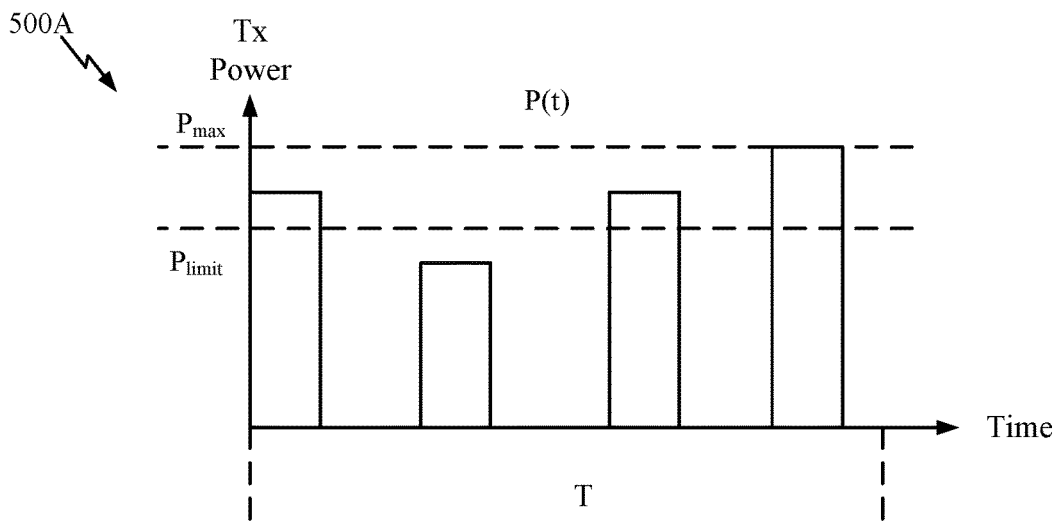
FIGS. 5A, 5B, and 5C are graphs illustrating examples of transmit powers over time in compliance with an RF exposure limit, in accordance with certain aspects of the present disclosure.

In certain cases, time-averaging of RF exposure may be performed to be in compliance with the RF exposure limit within a specified time window (T) (e.g., 2 seconds for 60 GHz bands, 100 or 360 seconds for bands ≤6 GHz, etc.) associated with the RF exposure limit. For example, FIG. 5A is a graph 500A of a transmit power over time (P(t)) that varies over the time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). That is, the transmit power may be greater than the maximum time-averaged transmit power level $P_{limit}$. In certain cases, the UE may transmit at $P_{max}$, which is the maximum transmit power supported by the UE. In certain cases, the UE may transmit at a transmit power less than or equal to the maximum time-averaged transmit power level $P_{limit}$ in certain transmission occasions. The maximum time-averaged transmit power level $P_{limit}$ represents the time-averaged threshold for the RF exposure limit in terms of transmit power, and in certain cases, $P_{limit}$ may be referred to as the maximum time-averaged power level or limit, or maximum average transmit power level. The graph 500A also illustrates gaps between transmission bursts, where the gaps represent periods during which no transmission was sent from the device.

Figure 5B:
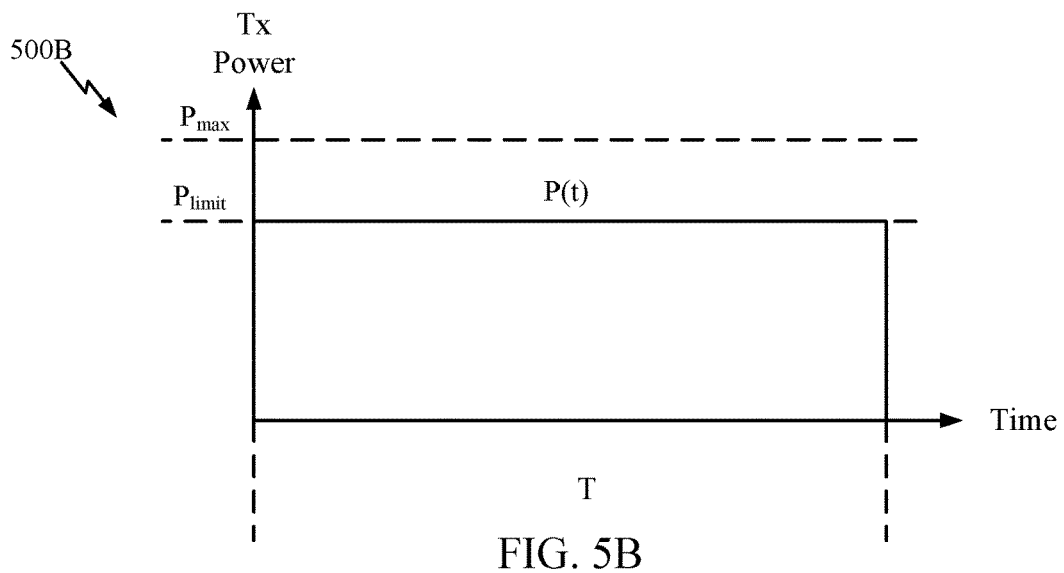

In certain cases, the transmit power may be maintained at the maximum average transmit power level (e.g., $P_{limit}$) allowed for RF exposure compliance that enables continuous transmission during the time window. For example, FIG. 5B is a graph 500B of a transmit power over time (P(t)) illustrating an example where the transmit power is limited to $P_{limit}$, in accordance with certain aspects of the present disclosure. As shown, the UE can transmit continuously at $P_{limit}$ in compliance with the RF exposure limit.

Figure 5C:
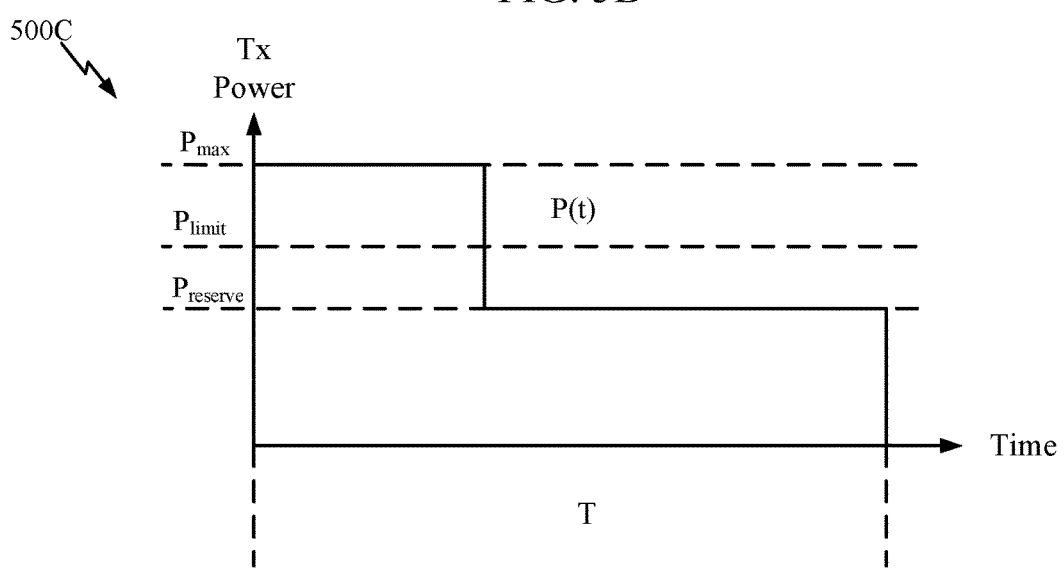

FIG. 5C is a graph 500C of a transmit power over time (P(t)) illustrating a time-average mode that provides a reserve power margin to enable a continuous transmission within the time window (T), in accordance with certain aspects of the present disclosure. As shown, the transmit power may be backed off from the maximum instantaneous power ($P_{max}$) to a reserve power ($P_{reserve}$) before the transmitter would be turned off to reserve enough transmit power margin (e.g., difference between $P_{limit}$ and $P_{reserve}$) so that the UE can continue transmitting at the lower power ($P_{reserve}$) to maintain a continuous transmission during the time window (e.g., maintain a radio connection with a receiving entity). In some aspects, $P_{reserve}$ is set at a minimum power used to maintain a link or at such minimum power plus a margin. The transmit duration at $P_{max}$ may be referred to as the burst transmit time (or high power duration). When more margin is available in the future (after T seconds), the transmitter may be allowed to transmit at a higher power again (e.g., in short bursts at $P_{max}$).

In the time-average mode, $P_{max}$ and $P_{reserve}$ time durations may be controlled by a processor or control logic to ensure the time-averaged power does not exceed $P_{limit}$ in the time window. In some aspects, the UE may transmit at a power that is higher than the average power level, but less than $P_{max}$ in the time-average mode illustrated in FIG. 5C. While a single transmit burst is illustrated in FIG. 5C, it will be understood that the UE may instead utilize a plurality of transmit bursts within the time window (T), for example, as described herein with respect to FIG. 5A, where the transmit bursts are separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above the maximum average power level (e.g., Piet).

While FIGS. 5A-5C illustrate continuous transmission over a window, occasion, burst, etc., it will be understood that a duty cycle for transmission may be implemented. In such implementations, a transmit power may be zero periodically and maintained at a higher level (e.g., a level as illustrated in FIGS. 5A-5C) during other portions of the duty cycle.

In certain aspects, the burst transmit time of P(t) at $P_{max}$ calculated for a given $P_{max}$, $P_{limit}$, $P_{reserve}$ and T, can be scaled depending on a duty cycle of the transmission to a receiving entity. For example, the burst transmit time may be adjusted by a factor associated with the duty cycle (1/duty_cycle), where duty_cycle is between [0, 1]. As used herein, the duty cycle of the transmission may refer to a portion of a specific period in which the transmission is scheduled or allocated. In aspects, the period associated with the burst transmit time may be independent of the time window (T) used for RF exposure compliance. In certain cases, the duty cycle may be standardized (e.g., predetermined) with a specific RAT and/or vary over time, for example, due to changes in radio conditions, mobility, and/or user behavior. In some examples, the duty cycle is determined by a base station (e.g., gNB) and communicated to a UE). With a 100% duty cycle, the UE may be assumed to be scheduled for continuous transmission, which may result in the transmit power depicted in FIG. 5B. In another example, suppose the duration of the burst transmit time is less than the time window and the period of the burst transmit time is greater than the time window such that a single pulse of the burst transmit time is active (or occurs) in the time window. The transmitter may increase the burst transmit time at $P_{max}$ due to there being no transmission during a portion of the time window (e.g., P(t) can go to zero for a portion of the time window).

Example Transmission-Pattern-Based RE Exposure Compliance

Multi-mode/multi-band UEs have multiple transmit antennas, which may be configured to simultaneously transmit in one or more sub-6 GHz bands and/or one or more bands greater than 6 GHz, such as mmWave bands. As described herein, the RF exposure of sub-6 GHz bands may be evaluated in terms of SAR, whereas the RF exposure of bands greater than 6 GHz may be evaluated in terms of PD. Due to the regulations on simultaneous exposure, the wireless communication device may limit maximum transmit power for sub-6 GHz bands and/or bands greater than 6 GHz.

Aspects of the present disclosure provide techniques for ensuring RF exposure compliance based on one or more patterns. The patterns may include a transmit power pattern associated with past transmissions over the course of various time periods (such as the past several minutes, hour(s), or day(s)) and/or an application pattern indicative of the periodic bursts of traffic that an application (e.g., a voice or video call application) may generate and/or indicative of the particular application or type of application which is transmitting. In certain aspects, the pattern may be used to identify when an upcoming transmission will occur, and the pattern may be correlated to various characteristics associated with the upcoming transmission, such as transmit times, transmit power over time, antenna switching, network conditions, sensor information, etc.

As an example, if the pattern indicates that the transmit time of the upcoming transmission is most likely relatively long (e.g., the transmit time is greater than the time window associated with the RF exposure limit) and/or that a consistent uplink transmission may be maintained over the time window, then the transmitter may allocate a lower power level (e.g., $P_{limit}$ where $P_{limit}<P_{max}$) to the upcoming transmission. If the pattern indicates that the transmit time of the upcoming transmission is most likely relatively short (e.g., the transmit time is less than the time window associated with the RF exposure limit) and/or that transmission is likely to be non-continuous (e.g., bursts and/or gaps are likely), then the transmitter may allocate a high instantaneous power (e.g., higher than $P_{limit}$ and/or less than or equal to $P_{max}$) to the upcoming transmission (e.g., to at least one of the bursts), yet still remain in compliance with the RF exposure limit.

The various techniques described herein for ensuring RF exposure compliance may enable desirable transmit powers for data transmissions. The desirable transmit power may provide desirable uplink/sidelink performance, such as desirable data rates, carrier aggregation, and/or a connection at the edge of a cell.

Figure 6:
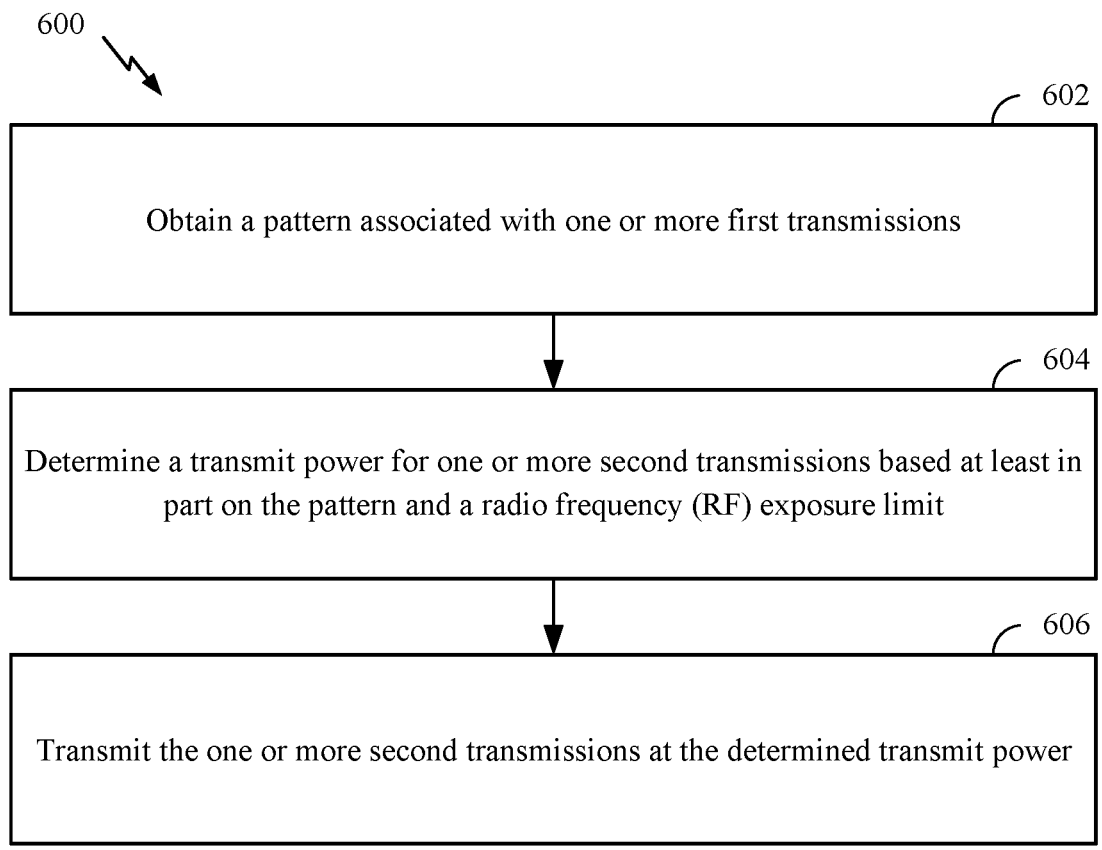
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., the UE 120a in the wireless communication network 100). The operations 600 may be implemented as software components that are executed and run on one or more processors (e.g., controller/processor 280 of FIG. 2). Further, the transmission of signals by the UE in the operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 602, where the UE may obtain a pattern associated with one or more first transmissions. For example, the UE may obtain a transmit power pattern indicative of transmit powers over time (such as the past few minutes, hour(s), or day(s)) associated with past transmissions sent by the UE. As used herein, a "pattern" generally refers to characteristics of the first transmissions, which may be past transmissions or samples thereof, and/or characteristics of a transmitter in the absence of the first transmissions, for example, when the pattern is representative of no uplink or sidelink traffic. That is, the pattern may be associated with a transmitter additionally or alternatively to the first transmissions. The characteristics may include, for example, indications of transmit power over time, network conditions over time, user behavior over time, application type over time, application behavior over time, whether voice and/or data is being transmitted over time, type of data being transmitted over time, priority or class of transmissions over time, antenna usage over time, sensor information over time, etc. In certain aspects, the pattern may include a periodic signature of characteristics over time, such as an indication that past transmissions had a periodicity. In some aspects, certain patterns may be interpreted as a "fingerprint" which is indicative of a certain environment in which the UE is located or of a certain scenario/user condition for the UE.

At block 604, the UE may determine a transmit power for one or more second transmissions based at least in part on the pattern and an RF exposure limit. As further described herein, the UE may correlate the pattern to an upcoming transmission, transmit time associated with the upcoming transmission, transmit power for the upcoming transmission, and/or a transmit power limit associated with the RF exposure limit. For example, the transmit power pattern may indicate that the UE transmitted in periodic bursts at certain time periods during the day. When an upcoming transmission aligns with the periodicity of the past bursts, the UE may determine the transmit power for the upcoming transmission based on the pattern associated with the past bursts. In certain aspects, the UE may periodically store the pattern (e.g., in the memory 282, or in memory which is tightly coupled with the processor 280 or modem) as characteristics in memory and retrieve the pattern for determining the transmit power at block 604.

In some aspects, the determined transmit power is at or near $P_{limit}$ unless it is determined based on the pattern obtained in block 602 that additional RF exposure margin is likely to be available. If the UE determines that additional margin is likely to be available, the UE may determine a transmit power which is higher than $P_{limit}$ (e.g., up to $P_{max}$). Determining to transmit at the higher transmit power may further be based one or more other factors or patterns. For example, the higher transmission power may be used when margin is likely to be available and it is further determined that the UE is at a cell edge or likely to travel to such an area, or margin is likely to be available and information having a higher priority is being transmitted. In some aspects, defaulting to a transmit power at or near $P_{limit}$ and selectively increasing the transmit power may increase the likelihood that transmissions are sent at $P_{limit}$ (which may, e.g., increase throughput and/or reliability) and/or reduce the amount of time during which transmissions are sent at a lower or backed-off power (for example, to comply with an exposure limit). At block 604, the UE may determine a transmission mode (e.g., as described with respect to FIGS. 5A-5C), and the transmit power may be determined to be at or near (e.g., lower than) $P_{limit}$, or higher than $P_{limit}$ (e.g., increased above $P_{limit}$), based on and/or in compliance with the determined transmission mode.

At block 606, the UE may transmit the one or more second transmissions at the determined transmit power. For example, the UE may transmit, to a base station (e.g., BS 110a), transmissions at the determined transmit power. In certain cases, the UE may transmit to another UE via a sidelink channel.

The pattern at blocks 602, 604 may include one or more patterns associated with the first transmissions. In aspects, the pattern may include at least one of a transmit power pattern, a user behavior pattern, an antenna usage pattern, an application type, an application pattern, a wireless network pattern, a transmission type or priority pattern, or sensor information, among other types of information and/or patterns. The transmit power pattern may include transmit powers over time (e.g. instantaneous transmit power as a function of time), for example, over a certain time window or over a collection of time windows. In certain cases, if the averaged power from a transmit power pattern is greater than or equal to a determined threshold (e.g., a threshold less than or equal to $P_{limit}$), then the UE may limit the power to a lower power level (e.g., $P_{limit}$ or lower) at all times. Otherwise, the UE may allow higher instantaneous transmit powers (>$P_{limit}$) within the time window. That is, the averaged power from the transmit power pattern may indicate how to determine the transmit power for the second transmissions. As an example, suppose the averaged power from the transmit power pattern is less than half of the average transmit power level (e.g., $P_{limit}$). This may indicate that the UE is likely to transmit very little uplink or sidelink traffic presently and/or in the near future, and the transmit power may be safely increased to be in compliance with the RF exposure limit. In certain cases, the transmit power pattern may indicate the duration of transmissions, and the durations may be used to determine the transmit power. For example, if the transmit power pattern indicates that the transmit time of the upcoming transmission is likely to be relatively long (e.g., the transmit time is likely greater than the time window associated with the RF exposure limit) and/or that a consistent uplink transmission likely can be maintained over the time window, then the transmitter may allocate a lower power level (e.g., $P_{limit}$ where $P_{limit}<P_{max}$) to the upcoming transmission.

For certain aspects, the time window used for determining the pattern may be separate from another time window (e.g., the time window (T) in FIGS. 5A and 5B) associated with the RF exposure limit. For example, the time window used for the pattern may include information regarding transmissions which were prior to a time window that is being used to calculate a current RF exposure. In aspects, such prior information may have preceded the window being used to calculate the current RF exposure by a number of seconds, multiple minutes or hours, or several days or more. In aspects, the time window for the transmit power pattern may have a duration that is the same or different from the time window associated with the current RF exposure limit. The transmit power pattern may include one or more transmit powers over one or more time windows associated with the RF exposure limit. As an example, the time window for the transmit power pattern may have a duration of one or more seconds, one or more minutes, one or more hours, or one or more days. The UE may use the transmit power pattern associated with past transmissions to identify when upcoming (future) transmissions will occur, and the UE may determine the transmit power for the upcoming transmissions based on the transmit power pattern (and the RF exposure compliance).

In certain aspects, the transmit power pattern may be indicative of a rolling or moving average transmitted power over a time interval, where the time interval may be separate from the time window associated with the RF exposure limit. The average transmit power may be used in selecting a cap on the transmit power. For example, the UE may determine a potential instantaneous transmit power using a specific algorithm associated with the RF exposure limit, and the UE may cap that determined potential instantaneous transmit power to a level that is a reciprocal of past transmit power usage (e.g., the rolling average transmit power over the past X seconds), where 'X' may be less than the time window associated with the RF exposure limit. Such a reciprocal may be effective at adjusting the transmit power in scenarios of transmission bursts (for example, as depicted in FIG. 5A) or a continuous transmission (for example, as depicted in FIG. 5B). In aspects, the cap on the transmit power based on the average transmit power as described herein may account for changes in network duty_cycle over time, low or high transmit powers, and/or user behavior. The cap on the transmit power as described herein may be applied to frequency division duplex (FDD) and/or time division duplex (TDD) schemes. The cap on the transmit power as described herein may account for near, mid, and/or far cell power levels and/or user behavior (e.g., burst usage vs. continuous usage).

An example expression for determining the capped transmit power in a single transmission scenario is as follows:

$$MTPL' = \min\left\{MTPL, \frac{Plimit}{prev \cdot usage}\right\} \quad (9)$$

where MTPL' is the capped level for the transmit power for a single transmission; MTPL is the potential instantaneous maximum transmit power level determined for the RF exposure time window according to a specific algorithm; prev.usage may be the minimum of (e.g., the lowest value among) the normalized average transmit power over X seconds (e.g., average transmit power over X seconds/$P_{limit}$) and unity (i.e., 1, for the normalization of $P_{limit}/P_{limit}$); and $P_{limit}$ may be the maximum average transmit power corresponding to the RF exposure limit averaged over a time window T. Under Equation (9), if the average transmit power for the recent history of X seconds is zero, for example, in a bursty traffic scenario, MTPL' may equal MTPL and not be capped because $$\frac{Plimit}{prev \cdot \text{usage}}$$

will be extremely high. Thus, MTPL' may initially equal $P_{max}$. In a continuous transmission scenario, at the beginning of the transmission, MTPL' may also equal MTPL and not be capped, due to the lack of previous transmit history in the transmit power pattern. As the UE continues to transmit, the cap $$\frac{Plimit}{prev \cdot \text{usage}}$$

and hence, the instantaneous transmit power, will start to decrease and settle to $P_{limit}$ due to the $$\frac{Plimit}{prev \cdot \text{usage}}$$

term being less than or equal to the MTPL term, and near the end of a time window, the transmit power may be less than $P_{limit}$ due to the MTPL term being less than the $$\frac{Plimit}{prev \cdot \text{usage}}$$

term.

Example expressions for determining the capped transmit power in a dual transmission scenario are as follows:

$$pri \cdot MTPL' = \min\{pri \cdot MTPL, \max[pri \cdot a, pri \cdot b]\}, \quad (10a)$$

$$pri \cdot a = \frac{pri \cdot Plimit}{pri \cdot prev \cdot \text{usage} + sec \cdot prev \cdot \text{usage}} \times \frac{pri \cdot prev \cdot \text{usage}}{pri \cdot prev \cdot \text{usage} + sec \cdot prev \cdot \text{usage}},$$

$$pri \cdot b = \frac{pri \cdot Plimit}{\text{num\_Tx}}$$

$$sec \cdot MTPL' = \min\{sec \cdot MTPL, \max[sec \cdot a, sec \cdot b]\}, \quad (10b)$$

$$sec \cdot a \frac{sec \cdot Plimit}{pri \cdot prev \cdot \text{usage} + sec \cdot prev \cdot \text{usage}} \times \frac{sec \cdot prev \cdot \text{usage}}{pri \cdot prev \cdot \text{usage} + sec \cdot prev \cdot \text{usage}},$$

$$sec \cdot b = \frac{sec \cdot Plimit}{\text{num\_Tx}}$$

where "pri" denotes the parameters for a primary transmit radio, "sec" denotes the parameters for a secondary transmit radio, and num_Tx represents the total number of active transmit radios, which in this example, is two. The active transmit radios may refer to the transmit antenna(s) and/or antenna module(s), which includes an array of antennas, that will be simultaneously transmitting during the second transmissions.

An example expression for determining the capped transmit power in a multi-transmission scenario is as follows:

$$MTPL'_i = \min\{MTPL_i, \max[a_i, b_i]\}, \quad (11)$$

$$a_i = \frac{Plimit_i}{\sum_{n=1}^{num\_Tx} prev \cdot \text{usage}_n} \times \frac{prev \cdot \text{usage}_i}{\sum_{n=1}^{num\_Tx} prev \cdot \text{usage}_n},$$

$$b_i = \frac{Plimit_i}{\text{num\_Tx}}$$

where i is the index for a particular radio among a plurality of radios.

With respect to the operations 600, the transmit power determination at block 604 may include determining a first transmit power (e.g., MTPL) and determining a second transmit power $$\left(e.g., \frac{Plimit}{prev \cdot \text{usage}}\right)$$

based at least in part on a normalized average transmitted power (e.g., prev.usage) over a time interval (e.g., X seconds, which may be less than the time window associated with the RF exposure limit). The UE may select a third transmit power as a minimum of the first transmit power and the second transmit power, for example, as described herein with respect to Equation (9). The UE may determine the transmit power for the one or more second transmissions such that the transmit power is less than or equal to the third transmit power. The second transmit power may be based at least in part on a reciprocal of the normalized average transmitted power $$\left(e.g., \frac{1}{prev \cdot \text{usage}}\right)$$

in a past time interval. The second transmit power may be a product $$\left(e.g., \frac{Plimit}{prev \cdot \text{usage}}\right)$$

a maximum average power (e.g., $P_{limit}$) corresponding to the RF exposure limit over a reciprocal of a minimum of the normalized average transmitted power and unity.

In a multi-transmission scenario, the transmit power determination at block 604 may include determining a first transmit power for each of a plurality of radios and determining a second transmit power for each of the plurality of radios, where the second transmit power may be based at least in part on a normalized average transmitted power for the respective radio over a time interval. The UE may select a third transmit power for each of the plurality of radios as a minimum of the first transmit power and the second transmit power for the respective radio. The UE may determine the transmit power for the one or more second transmissions such that the transmit power for each of the plurality of radios is less than or equal to the third transmit power for the respective radio.

The determination of the second transmit power may include determining a fourth transmit power $$\left(\text{e.g., } \frac{Plimit_i}{\sum_{n=1}^{num\_Tx} prev \cdot usage_n} \times \frac{prev \cdot usage_i}{\sum_{n=1}^{num\_Tx} prev \cdot usage_n}\right)$$

based at least in part on a product between a maximum average power corresponding to the RF exposure limit for the respective radio and a reciprocal of a sum of minimums of a normalized average transmitted power for the plurality of radios and unity. The fourth transmit power may be further based on a proportion between the normalized average transmitted power for the respective radio and a total of the normalized average transmitted powers for the plurality of radios. The UE may determine a fifth transmit power $$\left(\text{e.g., } \frac{Plimit_i}{num\_Tx}\right)$$

that is the maximum average power corresponding to the RF exposure limit divided by a number of the plurality of radios. The UE may select the second transmit power based on a maximum of (e.g., the largest value among) the fourth transmit power and the fifth transmit power (e.g., $\max[a_i, b_i]$).

In certain aspects, the time interval for the average transmit power used in selecting the transmit power cap may be updated dynamically, for example, based on the time-averaged exposure (or average transmit power) and/or network conditions. The time interval may be determined based on the following expression:

$$X = \max\{m, n \times (1 - \text{average\_exposure}(t))\} \quad (12)$$

where m may be the lowest value for X in terms of seconds, n may be the highest value for X in terms of seconds, and the average_exposure(t) may be the total average normalized exposure for all the transmitting radios (or sum of average transmit power/$P_{limit}$ for all past transmissions from all radios) over the past time window (T) associated with the RF exposure limit. In certain cases, n may be less than the time window associated with the RF exposure limit. Different X values may be suitable for short burst transmissions versus long transmissions. Equation (12) may enable a UE to adjust the time interval as the uplink and/or sidelink traffic changes over time. Additionally, m and/or n can also vary from one transmitting radio to another transmitting radio depending on the time-averaged window associated with the radio. For example, if two transmitting radios are averaged over two different time-averaged windows (for example, a time window for a sub-6 GHz radio and a separate time window for a mmWave radio), the value for X, and in certain cases, the values for m and/or n may be different between the two radios.

With respect to the operations 600, the transmit power determination at block 604 may include adjusting the time interval for the normalized average transmitted power based at least in part on an average power over a time window (T) corresponding to the RF exposure limit. In some aspects, the average power may be a rolling or moving average of the transmitted power over the time window. The time interval adjustment may include selecting a maximum among a first time interval (m) and a second time interval (n) varying with (e.g., proportional to) the average power over a past time window, for example, as described herein with respect to Equation (12). In certain cases, the first time interval and the second time interval depend on a transmission frequency of the one or more second transmissions. That is, the value for the first time interval and/or the value for the second time interval may vary depending on the transmission frequency. For example, the second time interval may be higher for sub-6 GHz transmissions than a corresponding second time interval for mmWave transmissions.

In certain aspects, the time interval may be adjusted based on one or more network conditions. For example, in poor network conditions (such as a UE being on a cell edge and/or being in a mobility scenario), the time interval may be adjusted to a longer duration, such as n in Equation (12), for example, due to the greater redundancy and longer transmissions encountered with poor network conditions. In desirable network conditions (such as the UE being stationary and in close proximity with a base station), the time interval may be adjusted to a short duration, such as m in Equation (12), for example, due to the reduced redundancy and shorter transmissions encountered with desirable network conditions. With respect to the operations 600, the transmit power determination at block 604 may include adjusting the time interval for the normalized average transmitted power based at least in part on one or more current network conditions, such as one or more of the parameters further described herein with respect to the network pattern.

In certain aspects, the cap on the maximum transmit power described herein may enable an implementation without altering the underlying algorithm or processing that determines MTPL, which guarantees RF exposure compliance. In other words, as the original algorithm or processing for MTPL is unaltered, the cap can be applied on any algorithm or processing that generates MTPL. In some aspects, the algorithm or processing that determines MTPL functions separately or independently of an algorithm or processing that determines the cap. For example, a first process may be executed to determine transmit powers that comply with RF exposure limits, and a second process may be independently executed to determine whether to cap the determined transmit powers. In some aspects, the second process runs on a different layer (e.g., an application layer or other layer, for example, in the Open Systems Interconnection (OSI) model) as compared to the first process.

The transmit power determination at block 604 may include determining a first transmit power (e.g., MTPL) and applying a cap to the first transmit power to determine a second transmit power (e.g., MTPL'), for example, as described herein with respect to Equation (9). The UE may determine the transmit power for the one or more second transmissions such that the transmit power is less than or equal to the second transmit power.

In certain aspects, the UE may determine the transmit power at block 604 by selecting one of three options: (1) the instantaneous transmit power (e.g., MTPL) determined according to a specific algorithm for RF exposure compliance; (2) a minimum of the instantaneous transmit power and the transmit power based on the normalized average transmitted power for a radio over a time interval $$\left(\text{e.g., } \frac{Plimit}{prev \cdot \text{usage}}\right),$$

where the minimum operations ensures compliance with the RF exposure limit; and (3) a minimum of the instantaneous transmit power and a maximum average power corresponding to the RF exposure limit (e.g., $P_{limit}$), where the minimum operations again ensures compliance with the RF exposure limit.

With respect to the operations 600, the transmit power determination at block 604 may further include determining a first transmit power (e.g., MTPL) for the one or more second transmissions based at least in part on a time-averaged RF exposure in a past time window; determining a second transmit power $$\left(\text{e.g., } \frac{Plimit}{prev \cdot \text{usage}}\right)$$

based at least in part on a normalized average transmitted power for a radio over a time interval; and determining a third transmit power (e.g., $P_{limit}$) that is a maximum average power corresponding to the RF exposure limit. The UE may select a fourth transmit power as a minimum of the first transmit power and the second transmit power for the radio and select a fifth transmit power as a minimum of the first transmit power and the third transmit power for the radio. The UE may select a sixth transmit power among the first transmit power, the fourth transmit power, and the fifth transmit power, for example, depending on the pattern as described herein. The UE may determine the transmit power for the one or more second transmissions such that the transmit power is less than or equal to the sixth transmit power for the radio.

In a multi-transmission scenario, the transmit power determination at block 604 may further include determining a first transmit power (e.g., $MTPL_i$) for each of a plurality of radios, where the first transmit power is based at least in part on a time-averaged RF exposure in a past time window; determining a second transmit power $$\left(\text{e.g., } \frac{Plimit_i}{\sum_{n=1}^{num\_Tx} prev \cdot usage_n} \times \frac{prev \cdot usage_i}{\sum_{n=1}^{num\_Tx} prev \cdot usage_n}\right) -$$

for each of the plurality of radios, where the second transmit power is based at least in part on a normalized average transmitted power for the respective radio over a time interval; and determining a third transmit power $$\left(\text{e.g., } \frac{Plimit_i}{num\_Tx}\right)$$

for each of the plurality of radios, where the third transmit power is a maximum average power (e.g., $P_{limit}$) corresponding to the RF exposure limit divided by a number of the plurality of radios. The UE may select a fourth transmit power for each of the plurality of radios as a minimum of the first transmit power and the second transmit power for the respective radio and select a fifth transmit power for each of the plurality of radios as a minimum of the first transmit power and the third transmit power for the respective radio. The UE may select a sixth transmit power for each of the plurality of radios among the first transmit power, the fourth transmit power, and the fifth transmit power for the respective radio, for example, depending on the pattern as described herein. The UE may determine the transmit power for the one or more second transmissions such that the transmit power for each of the plurality of radios is less than or equal to the sixth transmit power for the respective radio.

The antenna usage pattern may indicate when the UE switches to a different transmission antenna and the duration the UE uses a particular antenna for transmission over time. For example, the UE may identify when the UE has switched to a different transmission antenna based on the antenna usage pattern, and the UE may perform such a switch for the second transmissions in order to gain more RF exposure margin (e.g., if the target antenna for the antenna change is not in close proximity to human tissue) or determine that another antenna with more RF exposure margin is likely to be available for use at a later time and thus additional power can be assigned to a current transmission with a relatively low risk of exceeding the RF exposure limit in the future.

Certain aspects of the present disclosure may provide an apparatus and/or technique for setting a transmit power ceiling for a specific radio, for example, based on the antenna usage associated with other radios, where the transmit power ceiling is separate from the average power limit associated with an RF exposure limit and the maximum transmit power supported by a radio. That is, the antenna usage over time for one or more radios (e.g., sub-6 GHz radios) may be used to determine the transmit power for another radio (e.g., a mmWave radio) in a multi-radio transmission scenario. When ensuring RF exposure compliance, the overall available RF exposure margin based on past usage of all radios may be further split into separate margins for the radios based on a priority and/or a desirable margin for the radios. As further described herein, the margin for a specific radio may be adjusted over time, for example, based on the usage of other radios. If a radio desires consistent performance over time, the RF margin may be capped based on the average past usage of other radios. For example, suppose the past usage for a Frequency Range 1 (FR1) (sub-6 GHz) radio indicates that the FR1 radio is using a relative small portion of the total RF exposure margin. In such a case, the UE may allocate a transmit power ceiling for a Frequency Range 2 (FR2) (mmWave) radio to provide consistent performance based on the past usage for the FR1 radio. As an example, the UE may allocate a transmit power ceiling that devotes a majority of the RF exposure margin (e.g., 90%) to the FR2 radio.

In multi-transmission (e.g., when multiple radios are used for concurrent transmissions) and/or multi-radio scenarios (e.g., when a wireless communication device is equipped with multiple radios), the overall available RF exposure margin may be determined according to the following expression:

$$A = 100\% - \text{past time-averaged usage of } (radio_1 + \ldots + radio_i) \quad (13)$$

where A is the overall available RF exposure margin, and the past time-averaged usage may be the sum of the time-averaged transmit powers over a specific time interval for each of the radios, such as a portion of the time window associated with an RF exposure limit, the whole time window, or a time interval longer than the time window (e.g., multiple time windows, one or more hours, or one or more days).

The individual RF exposure margins allocated to each radio may be determined according to the following expression:

$$\text{Margin}_1 = x_1 * A \text{ (for radio}_1\text{)},$$

$$\text{Margin}_2 = x_2 * A \text{ (for radio}_2\text{)}, \ldots,$$

$$\text{Margin}_i = x_i * A \text{ (for radio}_i\text{)}, \quad (14)$$

where $x_1$ through $x_i$ are factors used to allocate a proportion of the overall available RF exposure margin to respective radios, and $x_1 + x_2 + \ldots + x_i = 1$. In certain aspects, the UE may adjust the values of $x_1$ through $x_i$ for one or more of the radios depending on one or more criteria. For example, the value of x for a specific radio may be determined based on a likelihood of that radio being used for transmission, such as based on an application, a data buffer, a traffic model or pattern associated with the radio. In certain cases, the value of x for a specific radio may be determined based on a priority, such as a priority for a certain channel and/or RAT (e.g., LTE vs. 5G) over another, where a radio may be associated with a specific channel. The channel priority may be based on a transmission duty cycle associated with the channel. In the context of an application or a service, suppose one radio is transmitting content for a live video call and another radio is transmitting data. In such a case, for example, the UE may provide priority to the radio servicing the video call, which may result in a larger portion of the RF margin (i.e., a larger value for x) being assigned to that radio.

A transmit power ceiling for a specific radio (e.g., $\text{radio}_k$) may be determined according to the following expression:

$$\text{cap\_radio}_k = 100\% - \text{past time-averaged usage of remaining radios (radio}_1 + \text{radio}_2 + \ldots + \text{radio}_{k-1} + \text{radio}_{K+i}) \quad (15)$$

The RF margin allocated to $\text{radio}_k$ may be determined according to the following expression:

$$\text{minimum}(x_k * A, \text{cap\_radio}_k) \quad (16)$$

The operations 600 may further involve the UE determining a transmit power ceiling for a specific radio as described herein. In aspects, the antenna usage pattern may include a usage pattern for each radio among a plurality of radios (such as the transceivers 254a-254r of FIG. 2). At block 604, the UE may determine an overall available RF exposure margin based on a usage pattern for each radio among a plurality of radios, for example, according to Equation (13). In aspects, the UE may determine a difference of a maximum available usage (e.g., 100%) and a sum of the usage patterns for the radios (e.g., a sum of the average transmitted powers). In certain cases, such as a single-transmission scenario (e.g., when only a single radio is used for transmission) and/or single-radio scenario (e.g., when a wireless communication device is equipped with a single radio), the UE may determine the transmit power ceiling for a radio based on a usage pattern for the radio, and the UE may determine the transmit power for the one or more second transmissions based at least in part on the transmit power ceiling. In such cases, the transmit power ceiling may be less than a maximum transmit power ($P_{max}$) supported by the UE and greater than an average power limit ($P_{limit}$) associated with the RF exposure limit ($P_{limit} \leq P_{cap} \leq P_{max}$).

The UE may allocate an RF exposure margin to each of the radios based on the overall available RF exposure margin, for example, according to Equation (14). In aspects, the UE may allocate a proportion of the overall available RF exposure margin to each of the radios as the RF exposure margin for the respective radios. In certain cases, the UE may apply a priority to a specific radio in allocating the RF exposure margin to a specific radio. That is, the UE may allocate the proportion of the overall available RF exposure margin to each of the radios based at least in part on a priority associated with at least one of the radios. The priority and/or the proportion may be associated with at least one of a frequency band, an application, a service, a network condition, or an exposure scenario (e.g., head exposure, body exposure, extremity exposure, or hotspot exposure) associated with the respective radio. That is, the UE may control the split in available RF exposure margin among multiple radios in real-time by varying the values for the factors $x_1$ through $x_i$. In aspects, the UE may adjust the factors $x_1$ through $x_i$ in conjunction with radio priorities that can change over time with applications, network conditions, and/or usage scenarios (for example, hotspot mode). Expressed another way, the priorities and the proportions may be adjusted over time in response to changes to an application, service, network conditions, etc. For example, the UE may allocate a greater proportion of the overall available RF exposure margin to a particular radio based on that radio's operating frequency band, such as a mmWave radio. As an example, suppose the UE has a total of four radios. In this example, the UE may adjust the factor $x_k$ for the mmWave radio to be 0.5 and allocate the remaining RF exposure margin evenly among the remaining radios (e.g., 0.16).

The UE may determine a transmit power ceiling (e.g., $\text{cap\_radio}_k$) for one of the radios based on the usage pattern for each of the other radios, for example, according to Equation (15). In aspects, the UE may determine the transmit power ceiling to be a difference between the maximum available usage (e.g., 100%) and a sum of the usage patterns for each of the other radios (e.g., the sum of the average transmitted powers for the other radios).

The UE may determine the transmit power for the second transmissions based at least in part on the transmit power ceiling and the RF exposure margin allocated to the one of the radios. For example, the UE may determine the transmit power as being less than or equal to the RF margin allocated in Equation (16). In certain cases, the UE may adjust the transmit power ceiling in response to a change in the usage pattern for the radios (in a multi-radio scenario) and/or the radio (in a single-radio scenario). As an example, suppose the usage pattern for a sub-6 GHz radio indicates that more transmit power can be allocated to a mmWave radio, for example, due to a reduction in usage by the sub-6 GHz radio. In response to the updated usage pattern, the UE may increase the transmit power ceiling assigned to the mmWave radio based on the usage patterns for the other radios.

In certain aspects, the UE may adjust the transmit power ceiling in response to a change in a transmission scenario associated with the radios. For example, the transmission scenario may be associated with certain radios being used concurrently, an exposure scenario (head exposure, body exposure, extremity exposure, etc.), and/or a region in which the UE is located.

In certain aspects, the UE may adjust the transmit power ceiling based at least in part on a traffic model. The UE may develop a traffic model associated with the radios, where the traffic model indicates when to adjust the transmit power ceiling. As an example, the traffic model may provide that during a certain time of day, a higher transmit power ceiling may be allocated to a particular radio.

In aspects, the usage pattern for each radio among the plurality of radios may include an average transmitted power in a past time interval associated with the respective radio. For example, the UE may determine the average transmitted power for each of the radios over the past time window associated with an RF exposure limit.

Figure 9A:
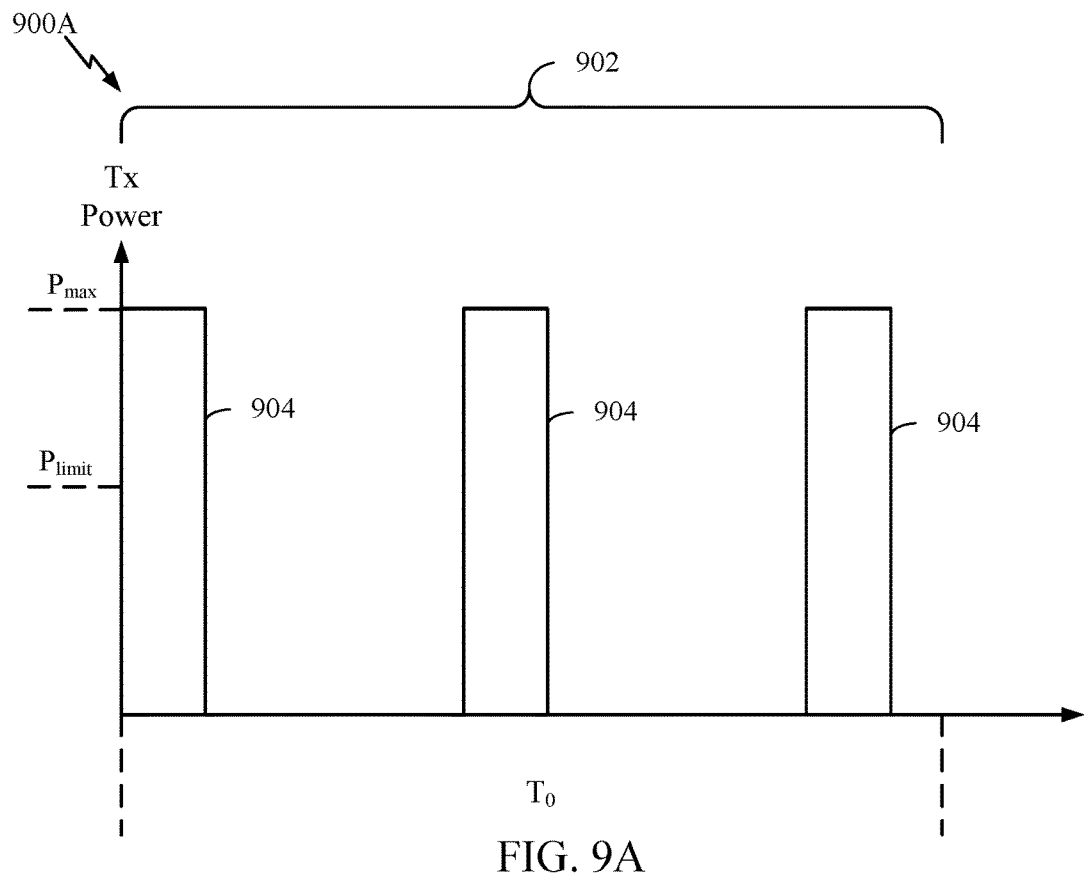
Figure 9B:
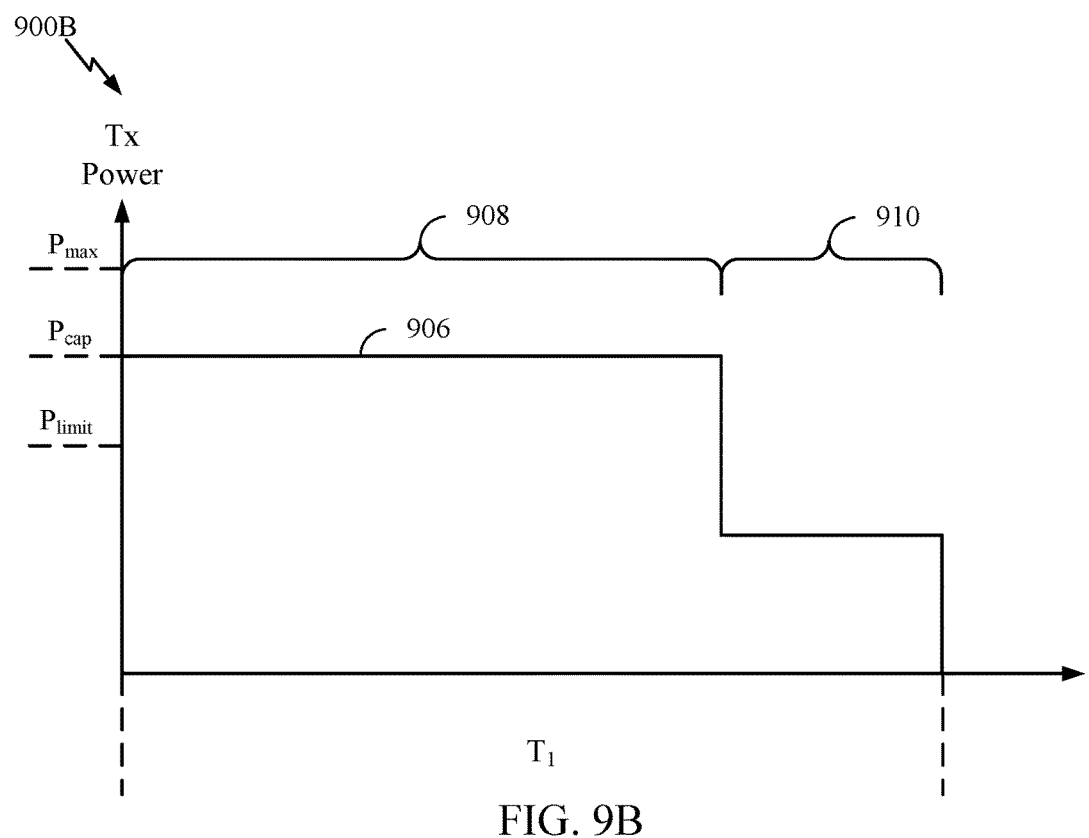
FIG. 9B is a graph illustrating applying a transmit power ceiling based on a pattern depicted in FIG. 9A, in accordance with certain aspects of the present disclosure.

At block 606, the UE may transmit the second transmissions at the transmit power ceiling for a first portion of a time window associated with the RF exposure limit and may transmit the second transmissions at another transmit power less than the transmit power ceiling for a second portion of the time window, for example, as described herein with respect to FIG. 9B.

The user behavior pattern may indicate when a user uses or does not use the UE for wireless communications. The user behavior pattern may include one or more times associated with when and/or how the user uses or does not use the UE for wireless communications. For example, if the user is likely to generate transmission data in periodic/non-periodic bursts or in a continuous manner (e.g., over long durations), the user behavior pattern may indicate when the user typically refrains from using the UE, such as during sleep, exercise, or other activities. During such periods, the UE may allow the transmit power to exceed the average power level (e.g., $P_{limit}$) in the time window for RF exposure compliance based on the assumption that additional transmissions probably will not be initiated by the user. That is, during such periods of likely low or no usage indicated by the user behavior pattern, the UE may determine that continuous transmission is unlikely (e.g., due to a user not being likely to initiate such transmission) and thus allow transmissions at instantaneous powers above $P_{limit}$ (e.g., at $P_{max}$). In contrast, during periods when the user typically uses the UE (e.g., when the user wakes up in the morning, during lunch, or in the evening), the UE may restrict transmissions at instantaneous powers above $P_{limit}$, for example, based on the assumption that additional transmission probably will be initiated by the user and thus much of the transmission window will likely be occupied with transmissions at or near $P_{limit}$. That is, the UE may set the transmit power to be less than or equal to the maximum average transmit power level $P_{limit}$ during periods when uplink activity is more likely as indicated by the user behavior pattern. With respect to the operations 600, the transmit power determined at block 604 may be adjusted for the second transmissions based on the user behavior pattern.

The application pattern may indicate various characteristics associated with an application (e.g., a mobile software application) that generates data for transmission. In aspects, the application pattern may include a behavior of the application, which may indicate at least one of one or more transmit times or one or more transmit powers over time associated with the application. For example, if the application pattern indicates that the application generates data for transmission in periodic bursts, the UE may correlate the periodic bursts to the time window associated with the RF exposure limit and determine the transmit power available for the application's transmissions based on the duration of the periodic bursts. In certain cases, the pattern may indicate the application type associated with the application pattern. That is, the application type may indicate a kind of application that generates data for transmission. For example, the application type may be an indication that the application is a social media application, a messaging application, an email application, a video call application, a video conference application, a video game, a video streaming application, a navigation application, etc. In certain aspects, the UE may prioritize the transmit power for one or more applications based on the application type. The UE may identify the application type of the second transmissions, for example, based on the application type pattern and/or an explicit indication from an application processor (e.g., the controller 280) employed by the UE, and the UE may determine the transmit power for the second transmissions based on the application type having priority over other application types. For example, the UE may allocate more transmit power to applications that stream audio and/or video, such as a video call application or video conference application, versus other applications. In some scenarios, the UE may refrain from allowing lower priority applications to transmit at instantaneous power levels above the maximum average power level (e.g., Piet) when the UE has determined that it is likely that another application of higher priority will transmit data within the same exposure time window.

The wireless network pattern may indicate various aspects of the wireless network conditions. The wireless network pattern may include at least one of a channel quality between the UE and a receiving entity (e.g., one or more base stations or other UEs), a modulation and coding scheme (MCS) associated with the one or more first transmissions, a coding rate (e.g., the proportion of the data-stream that is non-redundant) associated with the one or more first transmissions, a periodicity associated with the one or more first transmissions, a duty cycle associated with the one or more first transmissions, or a mobility scenario, such as an indication of the UE's mobility during the one or more first transmissions. In certain cases, the wireless network pattern may indicate the past radio conditions (such as channel quality, MCS, coding rate, etc.) encountered by the UE over time. The UE may use the past radio conditions to anticipate future radio conditions and allocate the transmit power for such radio conditions accordingly. For example, suppose the UE identifies that the UE is engaged in a mobility scenario (such as a commute to or from work) at certain periods of time during the day. In such a case, UE may allocate a certain transmit power to accommodate the mobility scenario. For instance, the UE may allow for a transmit power at or above the maximum average transmit power limit ($P_{limit}$) when the UE identifies a cell edge (e.g., poor radio conditions) based on the mobility scenario indicated by the wireless network pattern. In contrast, when the UE identifies that the UE is effectively immobile, depending on the first transmissions, the UE may allocate a transmit power that is less than or equal to the maximum average transmit power limit ($P_{limit}$) for the second transmissions due to the assumption that the radio conditions will not adversely change (such as during a mobility scenario).

Other parameters associated with the wireless network conditions may also be included in the wireless network pattern, such as cell identifiers, the number of aggregated component carriers, the number of MIMO layers, the bandwidth, the subcarrier spacing, the frequency range (e.g., FR1 or FR2 under 5G NR), etc. In aspects, the channel quality may include a path loss, a channel quality indicator, signal-to-noise ratio (SNR), signal-to-interference-plus-noise ratio (SINR), signal-to-noise-plus-distortion ratio (SNDR), a reference signal received power (RSRP), and/or a received signal strength indicator (RSSI).

The transmission type or priority pattern may indicate what type of transmissions have been sent and/or what their relative priorities are. For example, this pattern may include information about whether a voice call or data has been transmitted and the pattern thereof. Such a pattern may be able to distinguish whether voice and data are being transmitted concurrently and/or whether a certain type of communication (e.g., voice) is likely to be initiated while transmitting another type of communication (e.g., data). The pattern may include the relative priorities of the transmission, such as voice having a higher priority than data or certain types of data (e.g., Voice over Internet Protocol (VoIP), videoconferencing, certain types of streaming) having a higher priority than other types of data (e.g., email or file upload). In some such aspects, a UE will not assign or will be less likely to assign an instantaneous transmit power above the maximum average power level ($P_{limit}$) when the pattern indicates that another transmission of higher priority is likely to be desired or when the type of information that is likely to be transmitted often involves a long transmission time (e.g., greater than an exposure time window) and/or a relatively consistent amount of power over time. In some aspects, one or more of the above patterns (e.g., the antenna usage pattern, the application pattern, and/or the transmission type pattern) may be used to determine whether to utilize a 4G service or a 5G service, and/or whether to transmit in a sub-6 GHz band or a mmWave band.

The sensor information may include various sensor data or information generated by the UE. The sensor information may include RF exposure sensor information over time such as the UE's distance to various human body parts (e.g., hand, head, or body) over time or when the UE is placed away from human tissue (e.g., in a hotspot scenario or being charged). The UE may use the RF exposure sensor information to adjust the maximum average transmit power level (e.g., $P_{limit}$) associated with the RF exposure limit. For example, in cases where the sensor information indicates that the UE will be in close proximity to human tissue (e.g., when the UE is typically placed in the pocket of a user), the UE may adjust (e.g., reduce) the maximum average transmit power level ($P_{limit}$) to be in compliance with this RF exposure scenario. In contrast, if the sensor information indicates that the UE will not be in close proximity to human tissue, the UE may adjust (e.g., increase) the maximum average transmit power level ($P_{limit}$) to be in compliance with this other RF exposure scenario. The sensor information may include at least one of an indication of the UE's proximity to a non-human object, an indication that the UE is in free space, an indication of a user usage scenario, an indication of a usage state of the UE, or an indication of when antenna switching occurs at the UE. In aspects, the user usage scenario may indicate to which portion of a user's body (e.g., hand, head, or body) the UE is in proximity. The usage state may indicate whether the UE is being used in proximity to human tissue, such as the UE being used as a hotspot without being in proximity to human tissue.

In certain aspects, the UE may use various models to determine the transmit power based on the pattern at block 606. The UE may use machine learning to predict/learn future transmissions events based on the pattern. For example, the UE may use machine learning to predict/learn future network/radio conditions (e.g., a home-to-work route) and/or user behavior based on past network conditions and/or user behavior, for example, represented by the wireless network pattern and/or the user behavior pattern. That is, the UE may use machine learning to map upcoming user behavior (e.g., data bursts or a big data package) to current network condition (e.g., stationary), or current user behavior to upcoming network conditions (e.g., in mobility scenario), or both upcoming user behavior and upcoming network conditions. In certain aspects, the UE may use machine learning to predict other characteristics associated with upcoming transmissions (such as antenna switching, sensor information, application type and/or behavior, etc.) from the pattern. In aspects, the characteristics predicted with the pattern may be generated with various models or estimates, such as machine learning, artificial intelligence, neural networks, regression analysis, etc.

At block 606 for certain aspects, the UE may determine the transmit power with machine learning based at least in part on the pattern. In certain cases, the UE may generate upcoming user behavior with machine learning based on the pattern (e.g., a user behavior pattern) and determine the transmit power based on the upcoming user behavior and current network conditions. In certain aspects, the UE may generate upcoming network conditions with machine learning based on the pattern (e.g., a wireless network pattern) and determine the transmit power based on current user behavior and the upcoming network conditions. In certain cases, the UE may generate upcoming network conditions and upcoming user behavior with machine learning based on the pattern (e.g., a wireless network pattern and user behavior pattern) and determine the transmit power based on the upcoming network conditions and the upcoming user behavior.

In aspects, the UE may correlate the pattern to a transmit time associated with the one or more second transmissions and compare the transmit time to a time window associated with the RF exposure limit. The UE may determine the transmit power based on the comparison. For example, suppose the pattern correlates to a short transmit time for an upcoming transmission that is less than a time window associated with an RF exposure limit, the UE may allocate a transmit power that is greater than the maximum average transmit power level ($P_{limit}$) and/or less than the maximum supported transmit power ($P_{max}$) for such a transmission.

In aspects, the RF exposure limit may be in compliance with the limits set according to a regulatory/standards body (e.g., the Federal Communications Commission (FCC) for the United States; Innovation, Science and Economic Development Canada (ISED) for Canada; or the International Commission on Non-Ionizing Radiation Protection (IC-NIRP) standard followed by the European Union (EU)). The RF exposure limit may include a SAR limit and/or a PD limit for various frequency ranges. In aspects, the UE may determine the transmit power at block 604 to be in compliance with the RF exposure limit. For example, when communicating via multiple wireless technologies, the UE may compare a combined normalized distribution, as described herein with respect to FIG. 4, with the RF exposure compliance threshold for the multiple technologies. The RF exposure limit may be averaged over time for a specified time window, such as 4 seconds for transmit frequencies between 24 GHz and 42 GHz, 100 seconds for transmit frequencies less than 3 GHz, or 360 seconds for transmit frequencies less than 6 GHz.

Figure 7A:
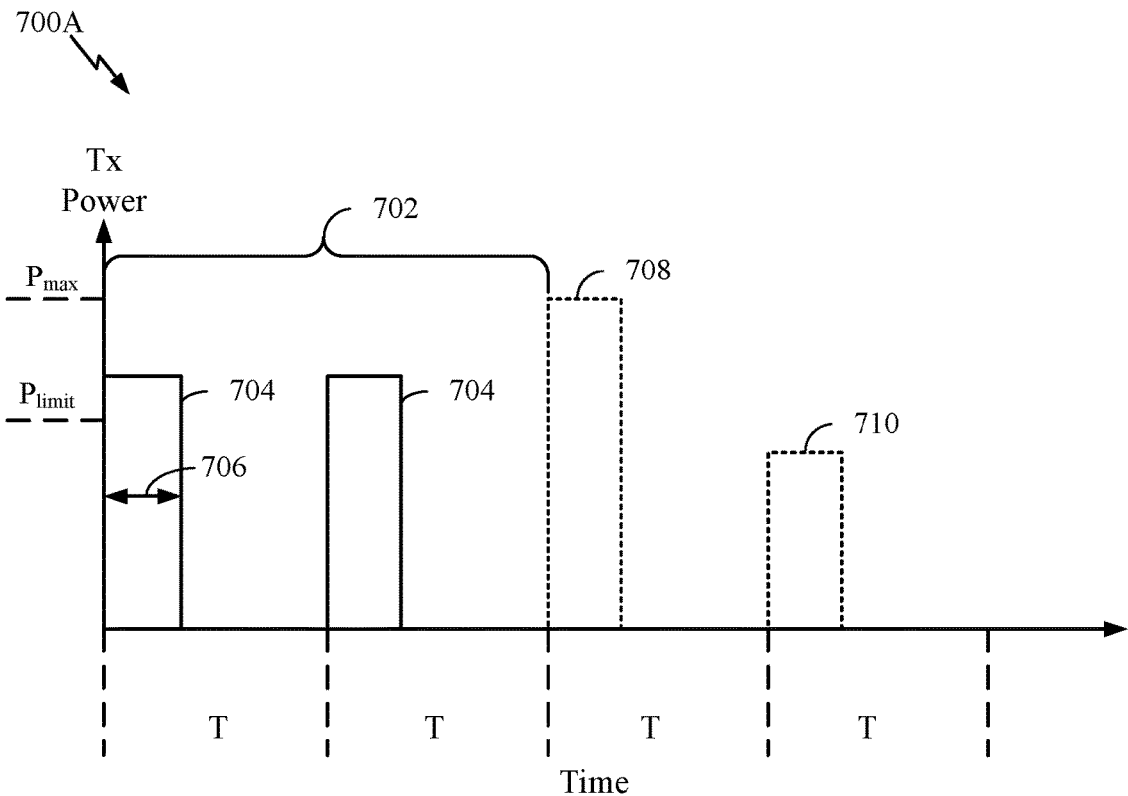
FIGS. 7A, 7B, 8A, 8B, and 9A are graphs illustrating example patterns used to determine one or more transmit powers over time, in accordance with certain aspects of the present disclosure.

FIG. 7A is a graph 700A illustrating an example pattern 702 being used to determine one or more transmit powers over time, in accordance with certain aspects of the present disclosure. In this example, the pattern 702 has two periodic first transmissions 704, where each of the first transmissions has a duration 706, which is less than a time window (T) associated with an RF exposure limit. The UE may determine from the pattern 702 that second transmissions 708, 710 are likely to be transmitted in the upcoming time windows. Based on the pattern 702, the UE may determine a transmit power for the second transmissions 708, 710. For example, the UE may identify that the first transmissions 704 have a transmit time (i.e., the duration 706) that is less than the time window (T). As such, the UE may allocate a transmit power to the second transmission 708 that is greater than $P_{limit}$ (such as $P_{max}$), for example, based on the pattern also indicating that the UE is likely to experience a mobility scenario. The UE may allocate the transmit power to the second transmission 710 at a transmit power closer to $P_{limit}$, for example, based on the pattern also indicating that the UE is likely to be immobile. The UE may determine whether to allocate a transmit power less than, equal to, or greater than the maximum average transmit power level ($P_{limit}$) based on the pattern, such as past network conditions, user behavior, application type, etc. In aspects, the pattern 702 may be (or derived from) one or more various patterns, such as a transmit power pattern, a user behavior pattern, an application pattern, a wireless network pattern, and/or a sensor information pattern. Although two time windows are used to determine a pattern in the graph 700A, it is to be understood that more or less than two time windows (or other time durations not based on exposure time windows) may be used for the basis of a pattern.

Figure 7B:
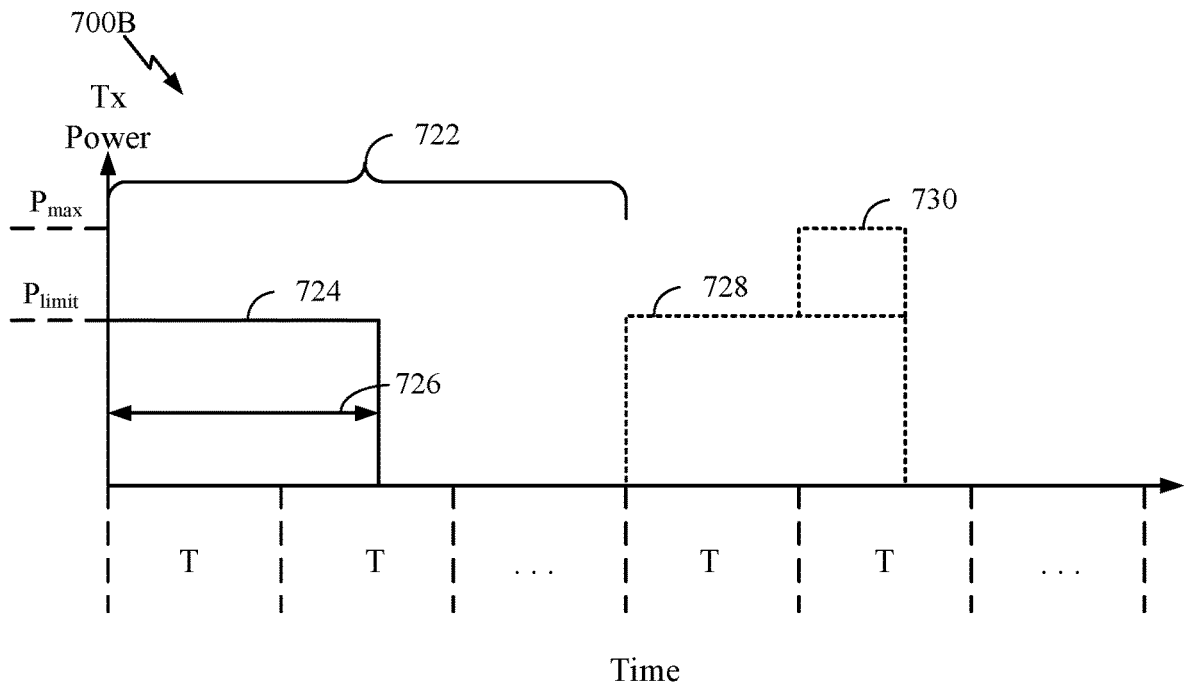

FIG. 7B is a graph 700B illustrating another example pattern 722 being used to determine one or more transmit powers over time, in accordance with certain aspects of the present disclosure. In this example, the pattern 722 has one periodic transmission 724 that has a duration 726 greater than the time window (T) for RF exposure. The UE may determine from the pattern 722 that additional transmissions which will consume a majority of the power available in an upcoming time window are likely to be transmitted in the upcoming time window. Based on the pattern 722, the UE may determine a transmit power for second transmissions 728. For example, the UE may identify that the first transmission 724 has a transmit time (i.e., the duration 726) that is greater than the time window (T). As such, the UE may allocate a transmit power to the second transmission 728 that is equal to or less than the maximum average transmit power level ($P_{limit}$). In certain cases, the UE may identify that upcoming transmissions are likely to overlap only a portion of one or more time windows (T), such that additional transmit power 730 may be allocated to the second transmission in one of the time windows (T).

Figure 8A:
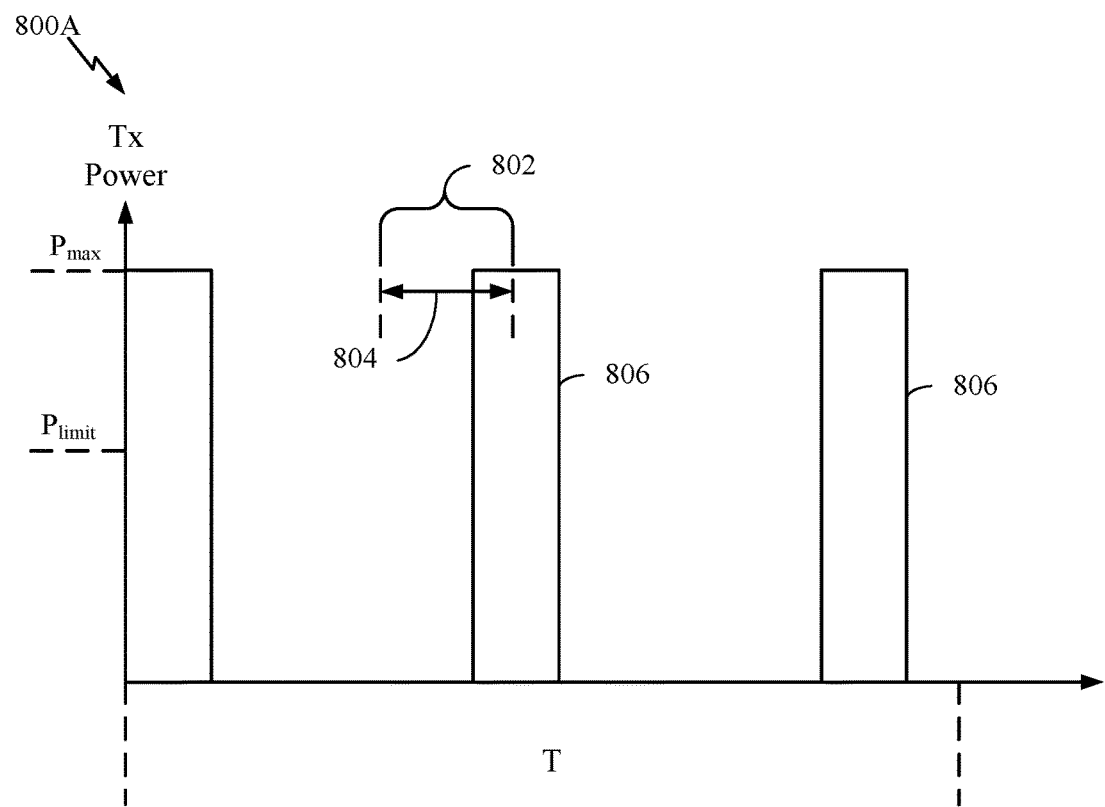

FIG. 8A is a graph 800A illustrating an example pattern 802 being used to determine one or more transmit powers over time for short transmissions (e.g., transmissions having a duration less than the RF exposure time window, also referred to as "bursty transmissions"), in accordance with certain aspects of the present disclosure. In this example, the pattern 802 may be indicative of an average transmit power over a time interval 804. In certain cases, the pattern 802 may include a rolling or moving average of the transmit power. The UE may select a new cap for the transmit power based on the pattern 802, for example, using Equation (9). Due to the average transmit power within the pattern 802 being less than $P_{limit}$, the UE may revert to using the MTPL as the maximum transmit power (e.g., $P_{max}$) available for transmission. The UE may allocate a transmit power for the transmission 806 that is equal to or less than the MTPL, which may equal $P_{max}$.

Figure 8B:
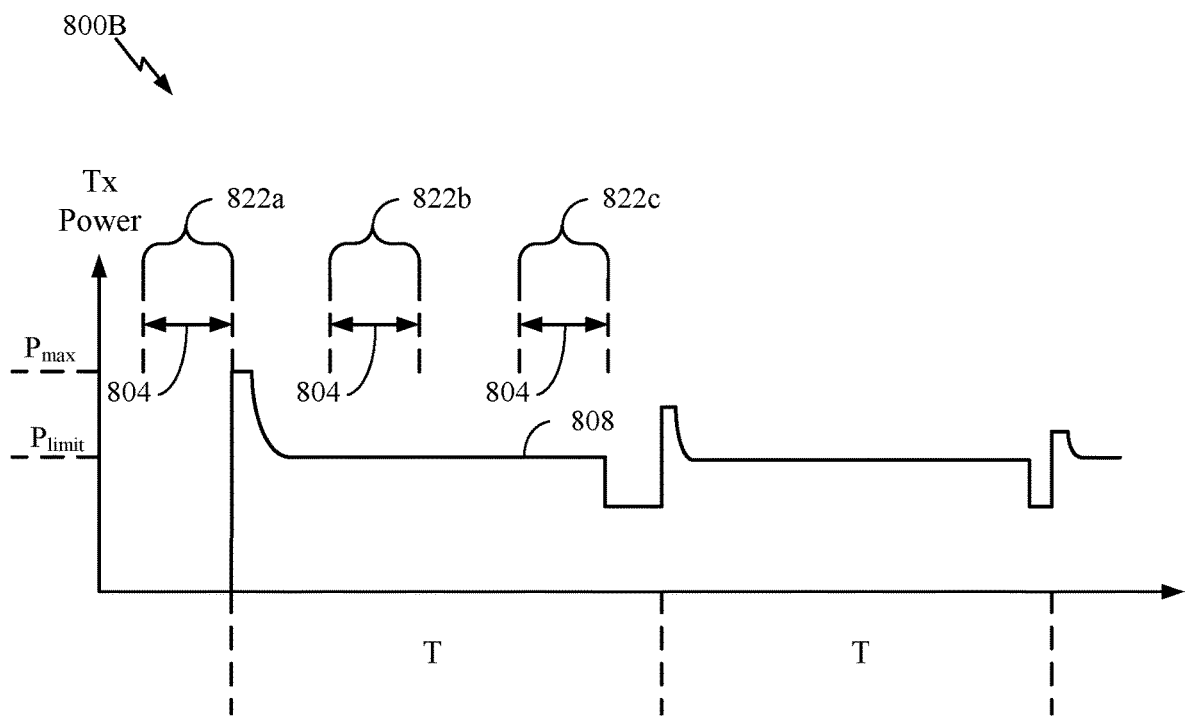

FIG. 8B is a graph 800B illustrating other example patterns 822a-c being used to determine one or more transmit powers over time for a long transmission (e.g., a transmission having a duration greater than the RF exposure time window), in accordance with certain aspects of the present disclosure. In this example, the transmission 808 may span across multiple time windows (T) associated with the RF exposure limit. At the beginning of the transmission 808, the average transmit power is zero within the time interval 804 of the first pattern 822a, such that the UE may select $P_{max}$ as the maximum transmit power, for example, under Equation (9). Due to the reciprocal cap, the transmit power may decay at a rate of the reciprocal function for the average transmit power, and the transmit power may settle to $P_{limit}$ as the average transmit power over the time interval approaches $P_{limit}$. At a subsequent transmission occasion (e.g., during the same time window T), the average transmit power may be equal to $P_{limit}$ within the time interval 804 of the second pattern 822b. In such a case, the UE may effectively select $P_{limit}$ as the minimum of MTPL and $$\frac{P_{limit}}{prev \cdot usage},$$

for example, due to the MTPL being greater than $$\frac{P_{limit}}{prev \cdot usage}.$$

At a later transmission occasion (e.g., during the same time window T), the average transmit power may still be equal to $P_{limit}$ within the time interval 804 of the third pattern 822c. However, MTPL may be less than $P_{limit}$ in order to ensure compliance with the RF exposure limit, such that the UE selects MTPL for the remainder of the time window (T) as the maximum transmit power available for the transmission 808.

In certain aspects, the transmit power selected by the UE at the beginning of a subsequent time window (T) is less than the transmit power selected at the beginning of the transmission 808. While the average transmitted power of the first pattern 822a is zero in the example illustrated in FIG. 8B, the average power transmitted between the end of the interval 804 corresponding to the pattern 822c and the beginning of the subsequent time window (T) is illustrated as being non-zero (e.g., between zero and $P_{limit}$). The transmit power selected by the UE (e.g., according to Equation (9)) at the beginning of this subsequent time window (T) may therefore be less than $P_{max}$ (but greater than $P_{limit}$). Further, the average transmit power selected at the end of this subsequent time window (T) may be even closer to $P_{limit}$ than the average transmit power selected at the end of the first time window. This may cause the transmit power selected by the UE at the beginning of an even later transmit window (T) (e.g., represented by the peak furthest to the right in FIG. 8B) to be closer to $P_{limit}$ as well. It can therefore be observed that in certain aspects, the transmission power selected by the UE will approach $P_{limit}$ for continuous/long (e.g., having a duration greater than a time window) transmissions.

While certain aspects of the present disclosure are described herein with respect to using a pattern, representing historical behaviors or conditions, to determine a transmit power in compliance with an RF exposure limit to facilitate understanding, a UE may also apply aspects of the present disclosure using current conditions (such as current radio conditions and/or a data buffer) to validate, adjust, or compensate the transmit power determination based on the pattern. For example, the UE may determine a likely or expected usage or transmit power in a current or future time window based on a pattern of past information, and may thereafter compare the likely or expected usage or transmit power to data stored in a transmit buffer. In some such aspects, the UE may determine a first power for a current or future transmission, and if the data in the transmit buffer differs from the expected usage by greater than a first threshold or would involve an amount of power to transmit which differs from the expected transmit power by more than a second threshold, the first power may be adjusted prior to being used to set an instantaneous transmit power.

It should be appreciated that determining the transmit power based on a pattern (e.g., a transmit power pattern, user behavior pattern, etc.) provides various advantages. In certain cases, the transmit power determination may enable the UE to allocate a transmit power that adapts to historical conditions and/or patterns in compliance with an RF exposure limit. With such an adaptive transmit power scheme, the UE may be able to provide desirable transmit powers for specific user behavior, network conditions, application types, etc.

FIG. 9A is a graph 900A illustrating an example antenna usage pattern 902 of a first radio, in accordance with certain aspects of the present disclosure. In this example, the antenna usage pattern 902 for the first radio shows that first transmissions 904 may be transmitted in bursts less than the time window $T_0$ associated with an RF exposure limit. In such a case, this may leave additional RF exposure margin for another radio, such as a second radio.

FIG. 9B is a graph 900B illustrating an example of setting a transmit power ceiling ($P_{cap}$) to the second radio based on the antenna usage pattern illustrated in FIG. 9A, in accordance with certain aspects of the present disclosure. In this example, the UE may determine the transmit power ceiling ($P_{cap}$) for the second radio according to Equation (15) and/or Equation (16). In certain cases, after a certain offset (t) in time from the instance of the time window $T_0$ in FIG. 9A, the UE may transmit a second transmission 906 at the transmit power ceiling for a first portion 908 of the time window Ti and transmit the second transmission 906 at another transmit power less than the transmit power ceiling for a second portion 910 of the time window Ti to maintain the averaged transmit power within the $P_{limit}$ associated with the RF exposure limit. As the time window $T_0$ may represent the time for a past usage pattern, Ti may be spaced in time from $T_0$ by a certain offset (t) in time. In certain aspects, the transmit power ceiling may facilitate a consistent level of performance for the second radio during the time window associated with the RF exposure limit.

The transmit power ceiling may apply to a single radio transmission scenario (e.g., where a single radio is transmitting) or a multi-radio transmission scenario (e.g., where multiple radios are transmitting concurrently). Capping $P_{max}$ may extend the portion of the time window where the wireless communication device is transmitting above $P_{limit}$. For single radio, where $P_{cap}$ is set less than $P_{max}$, the transmit power can transmit at the $P_{cap}$ level for a longer time before encountering an exposure limit when compared to transmitting at the $P_{max}$ level. Similarly for a multi-radio scenario, the portion of RF exposure margin ($x_k$*A) may be capped for radio$_k$, and $P_{cap}$ for radio$_k$ can be determined according to ($x_k$*A*$P_{limit\_radio\_k}$), where $P_{limit}$ is the average transmit power associated with the RF exposure limit.

Example Transmit Energy Depending on Transmit Time while Maintaining RF Exposure Compliance In certain aspects, the UE may consider future conditions (such as transmit time and/or radio conditions) in determining the transmit power for RF exposure compliance. Aspects of the present disclosure provide techniques and apparatus for determining transmit power and/or switching between the various transmission modes described herein based on a transmit time associated with data and/or radio conditions while ensuring RF exposure compliance. In certain aspects, the transmit time may be derived from a size (e.g., a data buffer size) associated with the data and a current (or predicted future) data rate. As an example, if the data buffer size is large (e.g., the transmit time is greater than the time window associated with the RF exposure limit), then the transmitter may operate under the peak mode (e.g., described herein with respect to FIG. 5B) to enable continuous transmission at the average power level (e.g., $P_{limit}$). If the data buffer size is small (e.g., the transmit time is less than the time window associated with the RF exposure limit), then the transmitter may operate under the time-average mode (e.g., described herein with respect to FIG. 5C) and transmit at the maximum power followed by reserve power if needed to complete the transmission.

The various techniques described herein for ensuring RF exposure compliance may enable desirable transmit powers for data transmissions and/or desirable power consumption. The desirable transmit power may provide desirable uplink/sidelink performance, such as desirable data rates, carrier aggregation, and/or a connection at the edge of a cell.

Figure 10A:
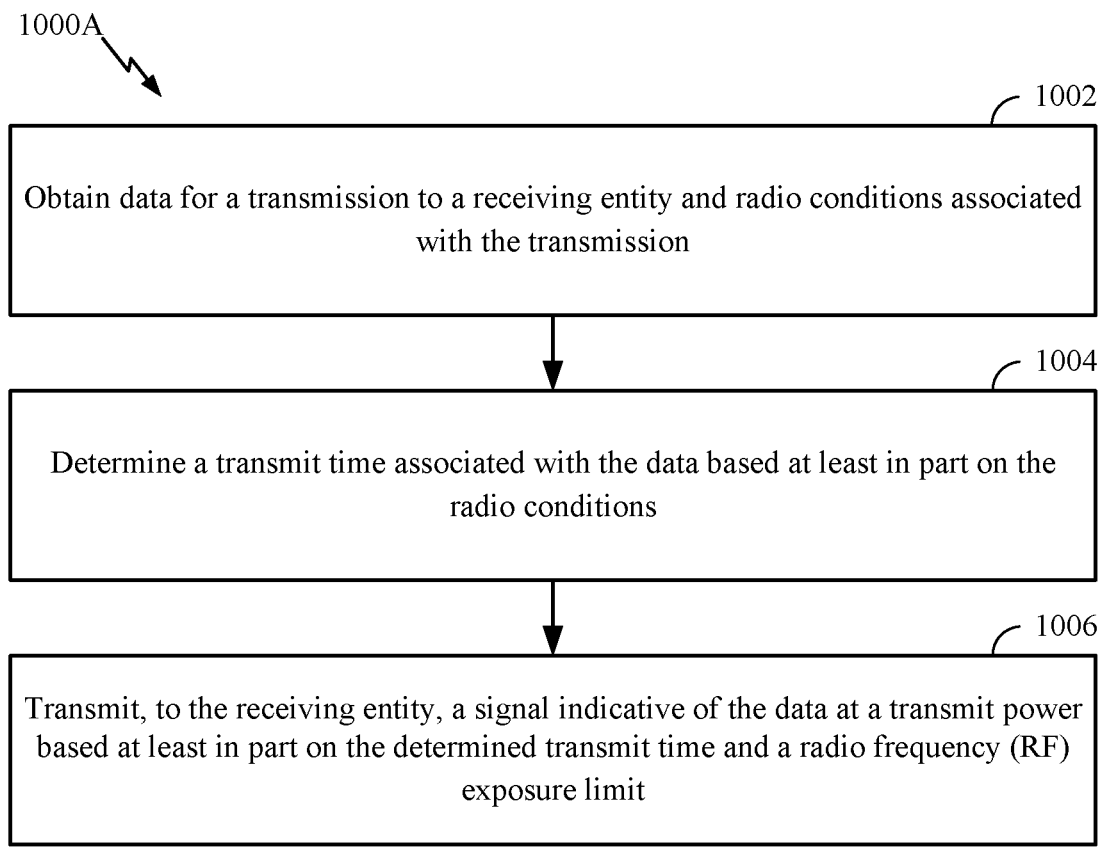
FIGS. 10A and 10B are flow diagrams illustrating example operations for wireless communication, in accordance with certain aspects of the present disclosure.

FIG. 10A is a flow diagram illustrating example operations 1000A for wireless communication, in accordance with certain aspects of the present disclosure. The operations 1000A may be performed, for example, by a UE (e.g., the UE 120a in the wireless communication network 100). The operations 1000A may be implemented as software components that are executed and run on one or more processors (e.g., controller/processor 280 of FIG. 2). Further, the transmission of signals by the UE in the operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000A may begin, at block 1002, where the UE may obtain data for a transmission to a receiving entity (e.g., the BS 110a or another UE) and radio conditions associated with the transmission. At block 1004, the UE may determine a transmit time associated with the data based at least in part on the radio conditions. At block 1006, the UE may transmit, to the receiving entity, a signal indicative of the data at a transmit power based at least in part on the determined transmit time and an RF exposure limit. In some aspects, the block 1004 may instead or in addition include selecting a mode from a plurality of transmission modes based on the radio conditions (or one or more other conditions) and/or the data, and the block 1006 may instead include transmitting, to the receiving entity, the signal indicative of the data at a transmit power based at least in part on the selected transmission mode and the RF exposure limit. In certain aspects, the transmission mode may be selected based on an application or service, such as a video call, voice call, live video stream, online game, etc. For example, in a video call, the transmission mode may be selected to transmit consistently (such as peak mode or similar to peak mode as described herein with respect to FIGS. 11A-11C) irrespective of the radio conditions or other conditions.

In certain aspects, the UE may determine the amount of transmit time that will be used to transmit the data to the receiving entity in order to select the transmission mode (e.g., time-average mode or peak mode). The determination of the transmit time may be derived using various factors such as a given transmit power, a data size or buffer size, and a data rate, which may be derived using current radio conditions. The data rate may depend on various factors or conditions, such as the channel quality between the UE and receiving entity, the path loss between the UE and receiving entity, the periodicity and/or duty cycle associated with transmissions to the receiving entity, the modulation and coding scheme (MCS), the coding rate (e.g., the proportion of the data-stream that is non-redundant), the number of aggregated component carriers, the number of MIMO layers, the bandwidth, the subcarrier spacing, the frequency range (e.g., FR1 or FR2 under 5G NR), etc. For example, a high MCS (e.g., 256QAM), high transmit power (e.g., $P_{max}$), high duty cycle, low path loss, and small data size may result in a relatively short transmit time (e.g., a transmit time less than the time window associated with the RF exposure limit). In aspects, the radio conditions may be obtained at block 1002 with a processor and/or modem, such as the controller 280 and/or modem (modulator/demodulator) in the transceivers 254.

With respect to the operations 1000A, the radio conditions may include at least one of a channel quality between the UE and the receiving entity, an MCS associated with the transmission, a coding rate associated with the transmission, a number of aggregated component carriers associated with the transmission, a number of MIMO layers associated with the transmission, a bandwidth, a subcarrier spacing, a frequency range associated with the transmission, or a periodicity associated with transmissions to the receiving entity. In aspects, the channel quality may include a path loss, a channel quality indicator, signal-to-noise ratio (SNR), signal-to-interference-plus-noise ratio (SINR), signal-to-noise-plus-distortion ratio (SNDR), a reference signal received power (RSRP), and/or a received signal strength indicator (RSSI). In some aspects, the radio conditions may correspond to or be determined based on the wireless network pattern described herein with respect to FIGS. 6-9B.

The radio conditions may be used to derive a data rate or throughput for transmitting the data to the receiving entity. The data rate may be determined in terms of megabits per second (Mbps). For example, the UE may determine a data rate associated with transmitting the data to the receiving entity based on the radio conditions, and the UE may determine the transmit time based on the data rate and a size associated with the data. In certain aspects, the UE may determine the data rate using the formula for the approximate maximum uplink data rate as specified in the 3GPP standards (such as Technical Specification 38.306, Section 4.1.2).

In certain aspects, the size associated with the data may be in terms of bytes, bits, or other units of computer/digital information. The size associated with the data may correspond to a data buffer size used to temporarily store the data for transmission. For example, the UE may determine the transmit time based at least in part on a buffer size associated with the data. In aspects, the UE may determine the transmit time based on a buffer size associated with the data (which may be referred to as an "upload data buffer size") and a data rate determined from the radio conditions. In certain aspects, instead of obtaining the data at block 1002, the UE may obtain the size associated with the data, and the UE may determine the transmit time associated with the data based on the data rate and data size.

In certain aspects, the transmit times may be determined for various transmit powers, such as an instantaneous power limit (e.g., $P_{max}$ in FIG. 5C) and an average power (e.g., $P_{limit}$ in FIG. 5B). As used herein the instantaneous power limit may refer to the maximum transmit power supported by the UE (such as $P_{max}$) or other transmit power above the average power. The average power may refer to the peak transmit power that can be maintained for the duration of a time window associated with an RF exposure limit in compliance with the RF exposure limit (such as $P_{limit}$). That is, the average power may be the average power level corresponding to the RF exposure limit (e.g., aligned with a regulatory requirement and/or a device manufacturer setting, which is based on the regulatory requirement, but may be lower than the regulatory requirement).

As an example, the transmit time may be selected from a plurality of transmit times associated with a plurality of transmit powers, where the plurality of transmit powers may include the transmit power at which the signal is transmitted at block 1006. The plurality of transmit times may include a first transmit time associated with an instantaneous power limit supported by the UE (e.g., the maximum transmit power supported by the UE) and a second transmit time associated with an average power corresponding to the RF exposure limit. In aspects, the first transmit time may be the duration that the UE takes to transmit the data at the instantaneous power limit (e.g., $P_{max}$) regardless of any power reserve margin and RF exposure compliance, and the second transmit time may be the duration that the UE takes to transmit the data at the average power ($P_{limit}$).

With the determined transmit times, the UE may select a transmission mode (such as the time-average mode or peak mode) to ensure RF exposure compliance with the RF exposure limit. As an example, the time-average mode may be suited for short transmit times or burst traffic to enable the UE to transmit at its maximum power (e.g., $P_{max}$), while still maintaining RF exposure compliance and reserving a transmit power margin within the time window associated with the RF exposure limit. The peak mode may be suited for transmissions with a relatively long transmit duration (e.g., transmissions with a duration greater than the time window). In certain cases, the transmitter may intelligently toggle between the time-average mode and peak mode based on the transmit times determined from the radio conditions (and in some cases, from the upload data buffer size). In some aspects, a transmit time is not explicitly calculated or determined, but a transmission mode is determined or otherwise selected based on one or more of the (radio) conditions described above and the data for transmission using the concepts discussed herein.

In aspects, the UE may select the transmission mode used to transmit the signal at block 1006 based on various thresholds/conditions associated with the transmit time (or otherwise based on the conditions) determined at block 1004. For example, if the transmit time at $P_{max}$ determined at block 1004 is less than or equal to the burst transmit time, the UE may operate in time-average mode to transmit the signal at block 1006, where the burst transmit time may refer to the maximum duration the UE can transmit at $P_{max}$ and have enough reserve power to continue transmitting at a reduced transmit power within the time window associated with the RF exposure limit. The reduced transmit power may be at a sufficient level to maintain a connection with the receiving entity. The burst transmit time may be the duration associated with $P_{max}$ as depicted in FIG. 5C (or the combined durations of multiple bursts). Here, the transmit time at $P_{max}$ and the burst transmit time may be scaled based on an estimated (uplink) transmission duty cycle (as described herein) for comparison between the transmit time at $P_{max}$ and the burst transmit time and/or for comparing against the time window. For example, if the transmission duty cycle is sufficiently low, the burst transmit time scaled by (1/duty_ cycle) may be greater than the time window, in which case, the UE may transmit at $P_{max}$ continuously in the time-average mode for such a low transmission duty_cycle without time-averaged exposure exceeding $P_{limit}$. Similarly, if $P_{limit} \geq P_{max}$, the burst transmit time will be greater than the time window (e.g., 4, 100 or 360 seconds), in which case, UE operation in either time-average mode or peak mode will allow the UE to transmit at $P_{max}$ continuously and time-averaged transmit power will not exceed $P_{limit}$.

The UE may determine the peak transmit for a given $P_{max}$, $P_{limit}$, and/or $P_{reserve}$. If the transmit time at $P_{limit}$ as determined at block 1004 is greater than the time window (e.g., 4, 100, or 360 seconds) associated with the RF exposure limit, the UE may operate in peak mode to transmit the signal at block 1006. If any of the transmit times determined at block 1004 is greater than the burst transmit time and less than the time window associated with the RF exposure limit, the UE may operate in time-average mode to transmit the signal at block 1006. In such a case, the UE may transmit the signal at a power level between $P_{max}$ and $P_{limit}$ to provide a longer high power duration at this power level or transmit at $P_{max}$ and lower $P_{reserve}$ to increase the high power duration at the $P_{max}$ level. In other words, the transmit power at block 1006 may be adjusted (e.g., increased or decreased) while the signal is being transmitted to ensure compliance with the RF exposure limit.

With respect to the operations 1000A, the transmit power at block 1006 may be limited by the instantaneous power limit (e.g., $P_{max}$) if the first transmit time determined at block 1004 is less than or equal to a burst transmit time associated with the instantaneous power limit in compliance with the RF exposure limit, where the burst transmit time is less than a time window associated with the RF exposure limit. In aspects, the transmit power may be limited by the average power if the second transmit time determined at block 1004 is greater than or equal to the time window associated with the RF exposure limit. If the transmit time associated with any of the plurality of transmit powers determined at block 1004 is less than or equal to the time window, and is greater than or equal to the burst transmit time, the transmit power at block 1006 may be less than or equal to the instantaneous power limit and greater than the average power for a first portion of the transmit time, and the transmit power at block 1006 may be less than the average power for a second portion of the transmit time.

As an example, with respect to the operations 1000A, the transmit power at block 1006 may be set according to a time-average mode (such as the time-average mode described herein with respect to FIG. 5C) if the transmit time determined at block 1004 is less than or equal to the burst transmit time. The transmit power at block 1006 may be set according to a peak mode (such as the peak mode described herein with respect to FIG. 5B) if the transmit time determined at block 1004 is greater than or equal to the time window associated with the RF exposure limit. If the transmit time associated with any of the plurality of transmit powers determined at block 1004 is less than or equal to the time window and is greater than or equal to the burst transmit time, the transmit power at block 1006 may be set according to the time-average mode such that the transmit power is less than or equal to the instantaneous power limit and greater than the average power for a first portion of the transmit time, and the transmit power at block 1006 may be less than the average power for a second portion of the transmit time.

In certain aspects, the determination of the transmit times may be determined under the assumption that current network conditions remain the same throughout the transmission to the receiving entity. In mobility conditions (e.g., when the UE is moving within a wireless network and transmitting to one or more receiving entities), the UE may use various models to estimate the transmit time. For example, the UE may use machine learning to predict/learn future network/radio conditions (e.g., a home-to-work route), and the UE may compute the transmit time and/or select the transmission mode at block 1004 using the predicted network/radio conditions, for example to make a decision in selecting the time-average mode, peak mode, a combination thereof, or one or more other modes. With respect to the operations 1000A, the UE may determine the transmit time under mobility conditions associated with the UE based at least in part on future predicted radio conditions. In some aspects, the future predicted radio conditions may be generated with machine learning, artificial intelligence, neural networks, regression analysis, etc. In some aspects, a transmission mode is selected for the entirety of the data transmission. In other aspects, a transmission mode may be selected for each time window during which the data will be transmitted. For example, when data is transmitted during two time windows, the UE may select the peak mode and transmit a portion of the data using the peak mode during a first of the two time windows, and may select the time-average mode and transmit a remaining portion of the data using the time-average mode during a second of the two time windows. Those of skill in the art will appreciate that these are examples only, and that the UE may make other selections or other combinations of selections pursuant to the concepts described herein.

In some aspects, the future/current radio conditions, mobility conditions, buffer size, or other conditions described herein with respect to the operation 1000A and/or the operations 1000B may be generated based on a pattern, for example as described above with respect to FIGS. 6-9B, which may include parameters associated with past network conditions, user behavior, etc. In some aspects, a data or buffer size, data rate, transmission time, etc. may be predicted or a determined value pertaining to one of these aspects may be modified or revised based on a pattern. Thus, the determining a transmit time in block 1004, or any other operation described herein, may be based on a current or measured value (e.g., data currently in a buffer, measured SNR, etc.) and/or based on a predicted future value (e.g., additional data likely to be received in the buffer within a time window, changing network conditions, etc.), for example based on machine learning, artificial intelligence, and known or determined pattern(s), etc.

In some aspects, the RF exposure limit may be in compliance with the limits set according to a regulatory/standards body (e.g., the Federal Communications Commission (FCC) for the United States; the Innovation, Science and Economic Development Canada (ISED) for Canada; or the International Commission on Non-Ionizing Radiation Protection (ICNIRP) standard followed by the European Union (EU)). The RF exposure limit may include a SAR limit and/or a PD limit for various frequency ranges. The RF exposure limit may be averaged over time for a specified time window, such as 4 seconds for transmit frequencies between 24 GHz and 42 GHz, 100 seconds for transmit frequencies less than 3 GHz, or 360 seconds for transmit frequencies less than 6 GHz.

Figure 10B:
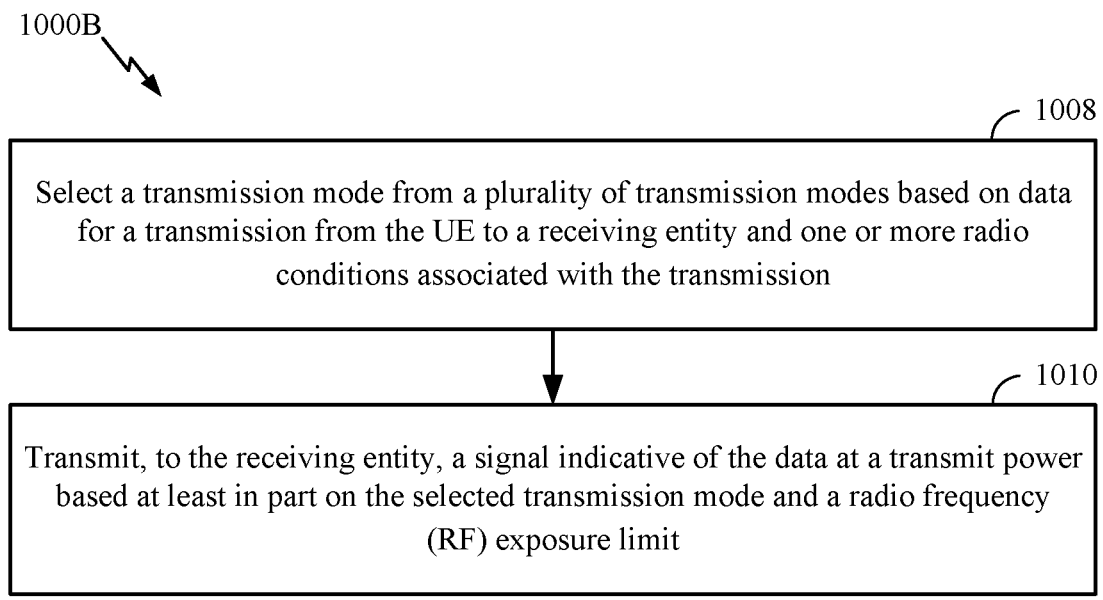

FIG. 10B is a flow diagram illustrating example operations 1000B for wireless communication, in accordance with certain aspects of the present disclosure. The operations 1000B may be performed, for example, by a UE (e.g., the UE 120a in the wireless communication network 100).

The operations 1000B may begin, at block 1008, where the UE may select a transmission mode from a plurality of transmission modes (e.g., the time-average mode and peak mode) based on data for a transmission from the UE to a receiving entity (e.g., the BS 110 and/or another UE 120) and one or more radio conditions associated with the transmission. The data and/or radio conditions may be current and/or measured, and/or future and/or predicted, e.g., using machine learning, artificial intelligence, and/or parameters associated with past behavior and/or a pattern. At block 1010, the UE may transmit, to the receiving entity, a signal indicative of the data at a transmit power based at least in part on the selected transmission mode and an RF exposure limit.

At block 1010 (or 1006), the UE may transmit at least a portion of the data at a power level above an average power for the RF exposure limit. At block 1010 (or 1006), the UE may transmit at a reserve power level (e.g., the reserve power $P_{reserve}$), lower than the average power level, for at least a portion of a time window in which the portion of the data was transmitted. In certain aspects, the reserve power level may be adjusted, for example, as further described herein.

The plurality of transmission modes may include at least a first mode and a second mode, where the first mode includes transmissions at levels above an average power for the RF exposure limit and below the average power, and the second mode includes transmissions at levels equal to or lower than the average power. In other words, the first mode may correspond to the time-average mode described herein with respect to FIG. 5C, and the second mode may correspond to the peak mode described herein with respect to FIG. 5B.

For certain aspects, the operations for determining the transmit power described herein may take into account or consider the transmission duty cycle, for example, in performing the operations 600, operations 1000A, and/or operations 1000B. For example, the burst transmit time of P(t) at $P_{max}$ can be scaled by a transmission duty cycle. For short duty cycles, the transmit power may be determined based on the duty cycle independently of the operations 600, operations 1000A, and/or operations 1000B, whereas for long duty cycles, the transmit power may be determined according to the operations 600, operations 1000A, and/or operations 1000B. For example, if the duty cycle is such that a maximum exposure won't be reached regardless of the power used when transmitting (e.g., because the amount of time during which transmission power is zero will cause the average power to be less than $P_{limit}$), the UE may set the power to be $P_{max}$ when transmitting (e.g., the time-average mode may be selected) even when the burst transmit time is greater than the time window.

In certain aspects, the UE may adjust the reserve power ($P_{reserve}$) based on one or more criteria, in addition to or as an alternative to the operations 600, operations 1000A, and/or operations 1000B. For example, after deciding whether to perform the time-average mode or peak mode in the operations 1000A and/or operations 1000B, a certain transmit power behavior can be obtained by adjusting the reserve power, such as increasing the reserve power or decreasing the reserve power to a particular level. The criteria used to adjust the reserve power may include machine learning or artificial intelligence that is used to predict certain future conditions (e.g., radio conditions, user behavior, mobility conditions, etc.) and/or estimate current conditions (e.g., a pattern described herein). The criteria may include a transmit time associated with a transmission, for example, as described herein with respect to the operations 1000A and/or operations 1000B. The criteria may include a preferred transmit power behavior or transmission mode, such as the peak mode depicted in FIG. 5B. The criteria may include the conditions and/or patterns described herein.

If the reserve power ($P_{reserve}$) is set to $P_{limit}$, the transmission will perform similar to peak mode as depicted in FIG. 5B, for example, in single transmission scenarios. If the reserve power is increased, the duration for $P_{max}$ reduces, and the duration for the reserve power increases, which may provide a consistent transmit power over time. On the high side, instead of setting the reserve power to $P_{limit}$, the reserve power can be set close to the $P_{limit}$ (e.g., 95% of the $P_{limit}$) such that 5% of energy can be used for high-power bursts at $P_{max}$, for example. In certain cases, any unused reserve power from a radio in a multi-transmission scenario may be allocated as part of the high-power burst margin or extra margin for other radios to use. In some aspects, the reserve power may be defined and selected in terms of certain states, such as high (e.g., 95% of $P_{limit}$), regular (e.g., 80% of $P_{limit}$), and low (e.g., 10% of $P_{limit}$).

In certain aspects, the reserve power may be adjusted in multi-transmission scenarios, for example, as described herein with respect to FIG. 6. For example, suppose a first radio requests a first reserve power and a second radio requests a second reserve power. The total reserve power shared between the first and second radios can be increased, if there is reserve power available after accounting for the first and second reserve powers. For example, the remaining reserve power ($P_{delta}$) may be determined according to the following expression:

$$P_{delta} = \max\{P_{reserve\_high} - P_{reserve\_radios}, 0\} \quad (17)$$

where $P_{reserve\_high}$ may be set to a particular power level less than or equal to Nam. (e.g., 95% of $P_{limit}$), and $P_{reserve\_radios}$ is equal to the sum of the reserve powers selected for each of the radios (e.g., the sum of the first reserve power for the first radio and the second reserve power for the second radio). Since the $P_{limit}$ values may be different among the radios in multi-transmission scenarios, Expression (17) could be performed by normalizing all the quantities relative to $P_{limit}$ of each radio. For example, $P_{reserve\_high}$ will be replaced by a normalized reserve_high (e.g., =0.95), $P_{reserve\_radios}$ will be replaced by a normalized reserve_radios (e.g., a sum of reserve powers selected for each of the active radios, such as $0.90 = P_{reserve1}/P_{limit1} + P_{reserve2}/P_{limit2} + \ldots + P_{reserveN}/P_{limitN}$), and $P_{delta}$ will be replaced by a normalized delta (e.g., 0.05). The remaining reserve power ($P_{delta}$) may be divided among the radios to increase the reserve powers for the respective radios. For example, the first reserve power for the first radio may be increased by a portion of Nora, and the second reserve power may be increased by the remaining portion of Paella. A factor may be used to determine the segmentation of the Nora, such as 1/(N radios). In certain aspects, the reserve power may be segmented differently across the radios, for example, based on an application or service used for the radio.

Figure 11A:
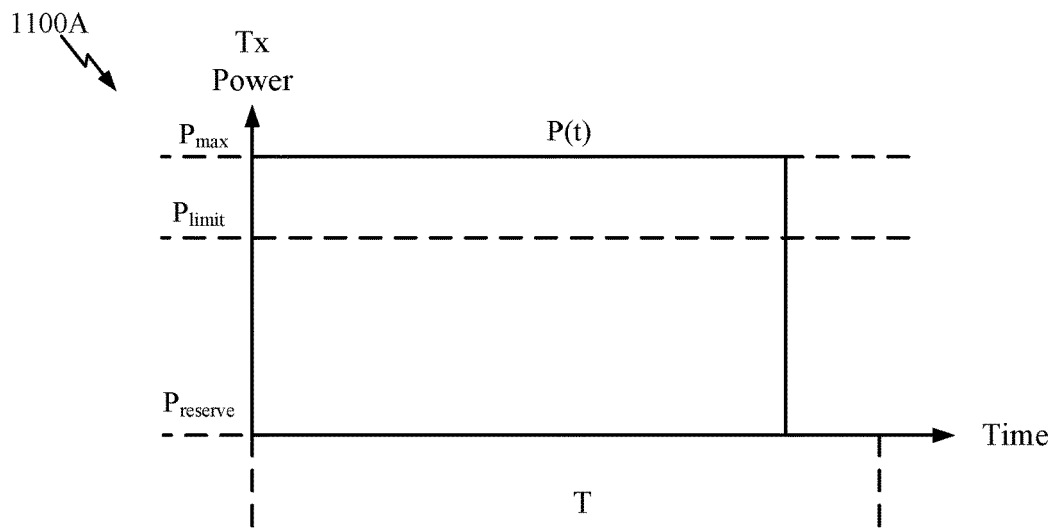
FIGS. 11A-C are graphs 1100A-1100C of transmit powers over time (P(t)) illustrating a time-average mode that uses a dynamic reserve power, in accordance with certain aspects of the present disclosure
Figure 11B:
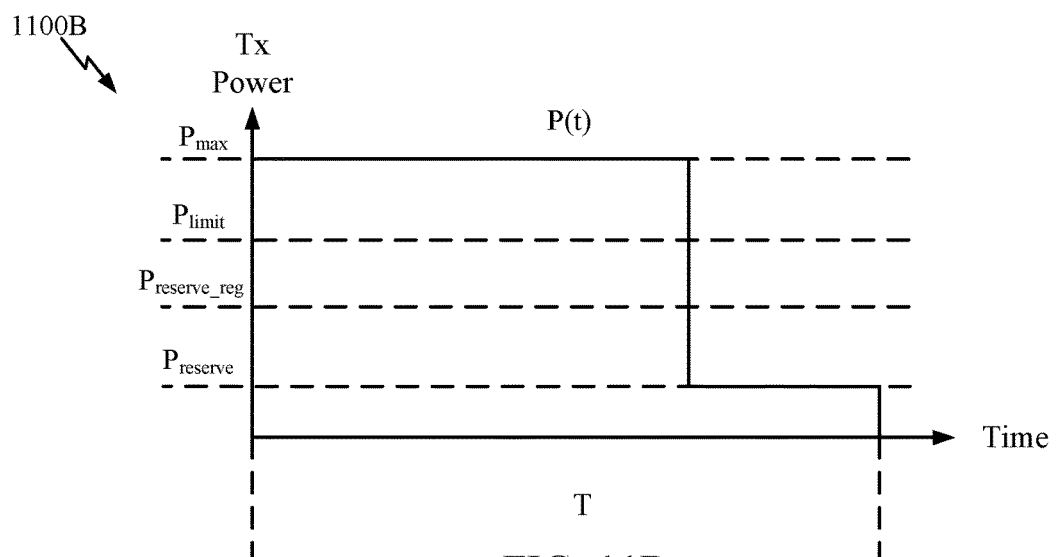
Figure 11C:
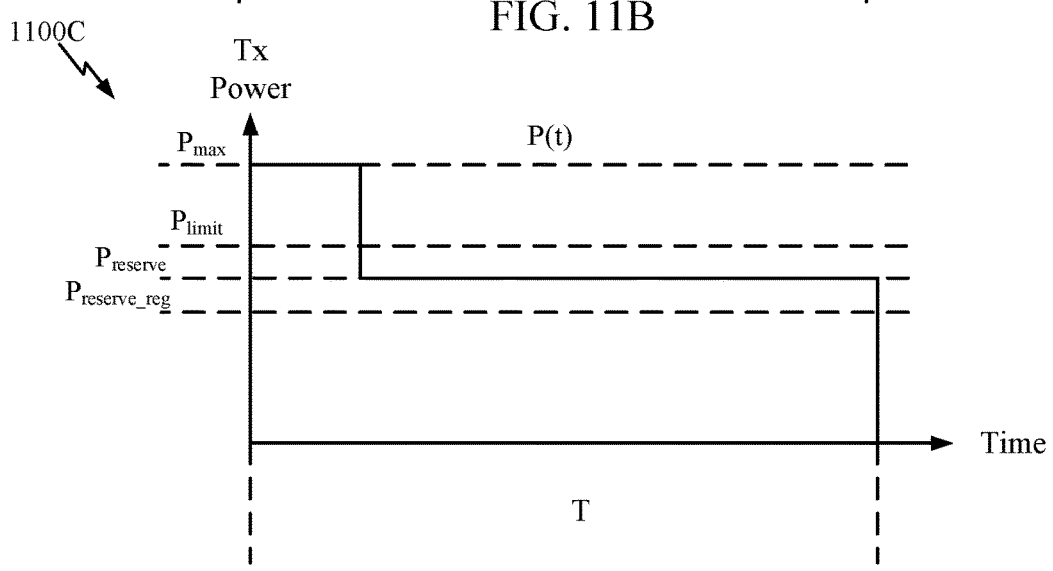

FIGS. 11A-C are graphs 1100A-1100C of transmit powers over time (P(t)) illustrating time-average modes that use a dynamic reserve power, in accordance with certain aspects of the present disclosure. Referring to FIG. 11A, the reserve power ($P_{reserve}$) may be set to zero or none, such that the longest duration for $P_{max}$ is obtained in the time window (T). Referring to FIG. 11B, the reserve power ($P_{reserve}$) may be set to a power level that is less than a certain value for the reserve power (e.g., $P_{reserve\_reg}$). Referring to FIG. 11C, the reserve power ($P_{reserve}$) may be set to a power level that is above the certain value for the reserve power (e.g., $P_{reserve\_reg}$).

Various aspects of the operations 1000B may be applied to the operations 1000A, or vice versa. For example, the UE may perform the selection at block 1008 based on the determined transmit time(s) derived from the radio conditions, data size, data rate, and/or specific transmit powers as described herein with respect to block 1004. At block 1006 (or 1010), the UE may transmit the signal based on the selected transmission mode associated with block 1008. In certain aspects, the transmit power used for the operation 1000A and/or operation 1000B may be set in conjunction with another algorithm, such as the operations described herein with respect to FIGS. 7A-9B, or performed independently from the other algorithm. In some such examples, the transmit power may be set lower than determined in operation 1000A or 1000B due to application of an algorithm described with respect to FIGS. 7A-9B.

While various aspects of the present disclosure are described herein with respect to selecting between the time-average mode or peak mode based on an estimated transmit time to facilitate understanding, aspects of the present disclosure may also be applied to selecting other transmission modes, such as the simple time-average mode or a combination of the time-average mode and peak mode, based on the estimated transmit time and/or one or more (radio) conditions. In some examples, a mode and/or transmit power may be selected or determined (e.g., at block 604, 1004, 1008) so as to maximize an amount of time during which a transmitting device (e.g., the UE) transmits at or above $P_{limit}$ (or an amount of power which is transmitted at or above $P_{limit}$). For example, if a burst or several bursts within a time window will be sufficient to transmit data, the UE may determine to transmit the burst(s) above $P_{limit}$ because there will be some time during which transmission power would be zero regardless (such as when the UE is done transmitting all the data) and transmitting above $P_{limit}$ increases or maximizes the transmit power which is at or above $P_{limit}$. As another example, if transmitting a burst would cause the UE to later reduce transmit power to be lower than $P_{limit}$ (e.g., to $P_{reserve}$), the UE may determine to instead transmit all of the data at $P_{limit}$ so that it's not later required to spend time transmitting below $P_{limit}$.

While the examples depicted in FIGS. 1-11C are described herein with respect to a UE performing the various methods for providing RF exposure compliance to facilitate understanding, aspects of the present disclosure may also be applied to other wireless communication devices (wireless devices), such as a base station and/or a CPE, performing the RF exposure compliance described herein. Further, while the examples are described with respect to communication between the UE (or other wireless device) and a network entity, the UE or other wireless device may be communicating with a device other than a network entity, for example another UE or with another device in a user's home that is not a network entity, for example.

Figure 12:
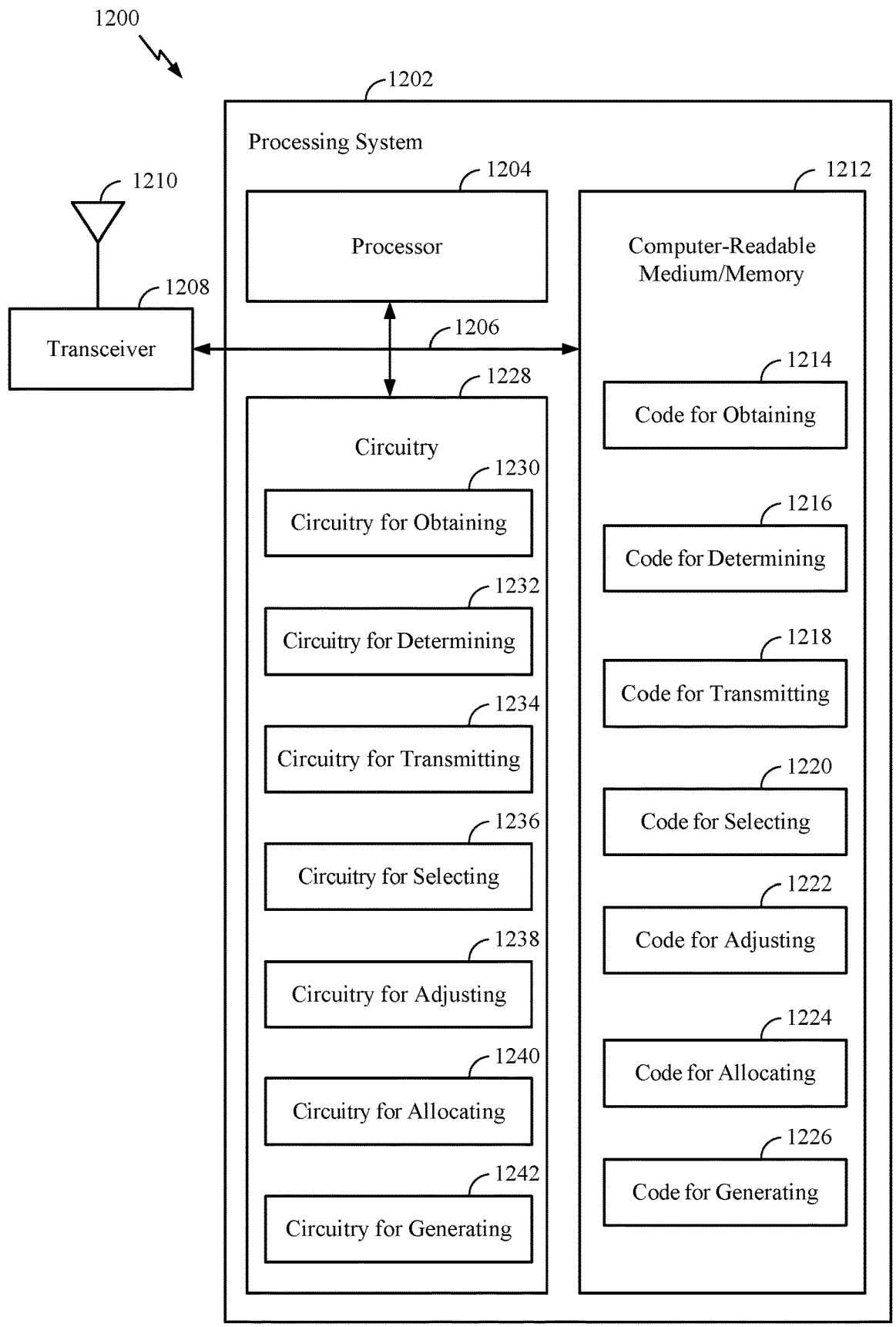
FIG. 12 illustrates a communications device (e.g., a UE) that may include various components configured to perform operations for the techniques disclosed herein, in accordance with certain aspects of the present disclosure.

FIG. 12 illustrates a communications device 1200 (e.g., the UE 120) that may include various components (e.g., corresponding to means-plus-function components) configured to perform operations for the techniques disclosed herein, such as the operations illustrated in FIGS. 6, 10A, and/or 10B. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 6, FIG. 10A, and/or FIG. 10B, or other operations for performing the various techniques discussed herein for providing RF exposure compliance. In certain aspects, computer-readable medium/memory 1212 stores code for obtaining 1214, code for determining or selecting (or allocating or generating) 1216, code for transmitting 1218, code for selecting 1220, code for adjusting 1222, code for allocating 1224, and/or code for generating 1226. In certain aspects, the processing system 1202 has circuitry 1228 configured to implement the code stored in the computer-readable medium/memory 1212. In certain aspects, the circuitry 1228 is coupled to the processor 1204 and/or the computer-readable medium/memory 1212 via the bus 1206. For example, the circuitry 1228 includes circuitry for obtaining 1230, circuitry for determining or selecting (or allocating or generating) 1232, circuitry for transmitting 1234, circuitry for selecting 1236, circuitry for adjusting 1238, circuitry for allocating 1240, and/or circuitry for generating 1242.

Various components of communications device 1200 may provide means for performing the methods described herein, including with respect to FIGS. 6-10B.

In some examples, means for transmitting or sending (or means for outputting for transmission) may include the transceivers 254 and/or antenna(s) 252 of the UE 120 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the UE 120 illustrated in FIG. 2 and/or transceiver 1208 and antenna 1210 of the communication device 1200 in FIG. 12.

In some examples, means for obtaining, means for determining, means for selecting, means for adjusting, and/or means for generating may include various processing system components, such as: the one or more processors 1204 in FIG. 12, or aspects of the UE 120 depicted in FIG. 2, including receive processor 258, transmit processor 264, TX MIMO processor 266, and/or controller/processor 280 (including RF exposure manager 281).

EXAMPLE ASPECTS

In addition to the various aspects described above, specific combinations of aspects are within the scope of the disclosure, some of which are detailed below:

Aspect 1. A method of wireless communication by a user equipment (UE), comprising: obtaining a pattern associated with one or more first transmissions; determining a transmit power for one or more second transmissions based at least in part on the pattern and a radio frequency (RF) exposure limit; and transmitting the one or more second transmissions at the determined transmit power.

Aspect 2. The method of Aspect 1, wherein the pattern includes at least one of: a transmit power pattern; an antenna usage pattern; a user behavior pattern; a transmission type; a priority pattern; an application pattern; an application type; a wireless network pattern; or a sensor information.

Aspect 3. The method of Aspect 2, wherein the transmit power pattern includes one or more transmit powers over one or more time windows associated with the RF exposure limit.

Aspect 4. The method according to Aspect 2 or 3, wherein the antenna usage pattern includes indications over time when the UE switched to a different transmission antenna.

Aspect 5. The method of Aspect 2, wherein the antenna usage pattern includes a usage pattern for each radio among a plurality of radios.

Aspect 6. The method of Aspect 2, wherein determining the transmit power comprises: determining an overall available RF exposure margin based on a usage pattern for each radio among a plurality of radios; allocating an RF exposure margin to each of the radios based on the overall available RF exposure margin; determining a transmit power ceiling for one of the radios based on the usage pattern for each of the other radios; and determining the transmit power for the one or more second transmissions based at least in part on the transmit power ceiling and the RF exposure margin allocated to the one of the radios.

Aspect 7. The method of Aspect 2, wherein determining the transmit power comprises: determining a transmit power ceiling for a radio based on a usage pattern for the radio; and determining the transmit power for the one or more second transmissions based at least in part on the transmit power ceiling.

Aspect 8. The method of Aspect 7, wherein the transmit power ceiling is less than a maximum transmit power supported by the UE and greater than an average power limit associated with the RF exposure limit.

Aspect 9. The method of Aspect 6, wherein the usage pattern for each radio among the plurality of radios comprises an average transmitted power in a past time interval associated with the respective radio.

Aspect 10. The method of Aspect 6, wherein determining the overall available RF exposure margin comprises determining a difference between a maximum available usage and a sum of the usage patterns for the radios.

Aspect 11. The method of Aspect 10, wherein allocating the RF exposure margin comprises allocating a proportion of the overall available RF exposure margin to each of the radios as the RF exposure margin for the respective radio.

Aspect 12. The method of Aspect 11, wherein allocating the proportion of the overall available RF exposure margin comprises allocating the proportion of the overall available RF exposure margin to each of the radios based at least in part on a priority associated with at least one of the radios.

Aspect 13. The method of Aspect 12, wherein at least one of the priority or the proportion of the overall available RF exposure margin is associated with at least one of a frequency band, an application, a service, a network condition, or an exposure scenario associated with the at least one of the radios.

Aspect 14. The method of Aspect 10, wherein determining the transmit power ceiling comprises determining a difference between the maximum available usage and a sum of the usage patterns for each of the other radios.

Aspect 15. The method of Aspect 6, wherein determining the transmit power comprises determining the transmit power such that the transmit power is less than or equal to a minimum of the transmit power ceiling and the RF exposure margin allocated to the one of the radios.

Aspect 16. The method of Aspect 6, wherein determining the transmit power comprises adjusting the transmit power ceiling in response to a change in the usage pattern for the radios.

Aspect 17. The method of Aspect 7, wherein determining the transmit power comprises adjusting the transmit power ceiling in response to a change in the usage pattern for the radio.

Aspect 18. The method of Aspect 16, wherein adjusting the transmit power ceiling comprises adjusting the transmit power ceiling in response to a change in a transmission scenario associated with the radios.

Aspect 19. The method of Aspect 16, wherein adjusting the transmit power ceiling comprises adjusting the transmit power ceiling based at least in part on a traffic model.

Aspect 20. The method according to Aspect 6 or 7, wherein transmitting the one or more second transmissions comprises transmitting the one or more second transmissions at the transmit power ceiling for a first portion of a time window associated with the RF exposure limit and transmitting the one or more second transmissions at another transmit power less than the transmit power ceiling for a second portion of the time window.

Aspect 16. The method according to any of Aspects 2-15, wherein the user behavior pattern includes one or more times associated with when a user uses the UE for wireless communications.

Aspect 17. The method according to any of Aspects 2-16, wherein the application pattern includes at least one of one or more transmit times or one or more transmit powers associated with one or more applications.

Aspect 18. The method according to any of Aspects 2-17, wherein the application type indicates a kind of application that generates data for transmission.

Aspect 19. The method of Aspect 18, wherein determining the transmit power comprises: determining the application type for the one or more second transmissions; and determining the transmit power based on the application type having priority over other application types.

Aspect 20. The method according to any of Aspects 2-19, wherein the wireless network pattern includes at least one of: a channel quality between the UE and a receiving entity; a modulation and coding scheme (MCS) associated with the one or more first transmissions; a coding rate associated with the one or more first transmissions; a periodicity associated with the one or more first transmissions; a duty cycle associated with the one or more first transmissions; or an indication of the UE's mobility during the one or more first transmissions.

Aspect 21. The method according to any of Aspects 2-20, wherein the sensor information pattern includes at least one of an indication of the UE's proximity to a non-human object, an indication that the UE is in free space, an indication of a user usage scenario, an indication of a usage state of the UE, or an indication of when antenna switching occurs at the UE.

Aspect 22. The method of Aspect 21, wherein the user usage scenario indicates to which portion of user's body the UE is in proximity.

Aspect 23. The method according to any of Aspects 1-22, wherein determining the transmit power comprises determining the transmit power with machine learning based at least in part on the pattern.

Aspect 24. The method of Aspect 23, wherein determining the transmit power comprises: generating upcoming user behavior with machine learning; and determining the transmit power based on the upcoming user behavior and current network conditions.

Aspect 25. The method of Aspect 23, wherein determining the transmit power comprises: generating upcoming network conditions with machine learning; and determining the transmit power based on current user behavior and the upcoming network conditions.

Aspect 26. The method of Aspect 23, wherein determining the transmit power comprises: generating upcoming network conditions and upcoming user behavior with machine learning; and determining the transmit power based on the upcoming network conditions and the upcoming user behavior.

Aspect 27. The method according to any of Aspects 1-26, wherein determining the transmit power comprises: correlating the pattern to a transmit time associated with the one or more second transmissions; comparing the transmit time to a time window associated with the RF exposure limit; and determining the transmit power based on the comparison.

Aspect 28. The method according to any of Aspects 1-27, wherein the RF exposure limit comprises a specific absorption rate (SAR) limit, a power density (PD) limit, or a combination thereof.

Aspect 29. The method according to any of Aspects 1-28, wherein at least one of the one or more first transmissions occurred at a time prior to a current time window used for determining the transmit power based on the RF exposure limit.

Aspect 30. The method according to any of Aspects 1-29, wherein the determining comprises determining the transmit power to be a power above an average power level when the pattern indicates that RF exposure margin is likely to be available, and determining the transmit power to be the average power level otherwise.

Aspect 31. The method of Aspect 30, wherein determining the transmit power to be a power above the average power level further comprises determining that a network condition indicates higher transmission power would be beneficial or determining that high priority information is being transmitted.

Aspect 32. The method according to any of Aspects 1-31, wherein the determining comprises comparing data stored in a transmit buffer to usage predicted based on the pattern or comparing transmit power used to transmit the data in the data buffer to a transmit power predicted based on the pattern.

Aspect 34. An apparatus for wireless communication, comprising: a memory; a processor coupled to the memory, the processor and the memory being configured to: obtain a pattern associated with one or more first transmissions, and determine a transmit power for one or more second transmissions based at least in part on the pattern and an RF exposure limit; and a transmitter configured to transmit the one or more second transmissions at the determined transmit power.

Aspect 35. The apparatus of Aspect 34, the apparatus being configured to perform any of Aspects 1 through 32.

Aspect 36. An apparatus for wireless communication, comprising: means for obtaining a pattern associated with one or more first transmissions; means for determining a transmit power for one or more second transmissions based at least in part on the pattern and an RF exposure limit; and means for transmitting the one or more second transmissions at the determined transmit power.

Aspect 37. The apparatus of Aspect 36, the apparatus comprising means for performing any of Aspects 1 through 32.

Aspect 38. A computer-readable medium having instructions stored thereon for: obtaining a pattern associated with one or more first transmissions; determining a transmit power for one or more second transmissions based at least in part on the pattern and an RF exposure limit; and transmitting the one or more second transmissions at the determined transmit power.

Aspect 39. The computer-readable medium of Aspect 38, the computer-readable medium having instructions stored thereon for performing any of Aspects 1 through 32.

In addition to the various aspects described above, specific combinations of aspects are within the scope of the disclosure, some of which are detailed below:

Aspect 1: An apparatus for wireless communication, comprising: a memory; and a processor coupled to the memory, the processor and the memory being configured to: obtain a pattern associated with one or more first transmissions, determine a transmit power for one or more second transmissions based at least in part on the pattern and a radio frequency (RF) exposure limit, and transmit the one or more second transmissions at the determined transmit power.

Aspect 2: The apparatus of Aspect 1, wherein the pattern includes at least one of: a transmit power pattern; an antenna usage pattern; a user behavior pattern; a transmission type; a priority pattern; an application pattern; an application type; a wireless network pattern; or a sensor information.

Aspect 3: The apparatus according to Aspect 1 or 2, wherein the processor and the memory are further configured to: determine a first transmit power; determine a second transmit power based at least in part on average transmitted power over a time interval; select a third transmit power as a minimum of the first transmit power and the second transmit power; and determine the transmit power for the one or more second transmissions such that the transmit power is less than or equal to the third transmit power.

Aspect 4: The apparatus of Aspect 3, wherein the second transmit power is based at least in part on a reciprocal of a normalized average transmitted power in a past time interval.

Aspect 5: The apparatus according to any of Aspects 1-4, wherein the processor and the memory are further configured to: determine a first transmit power for each of a plurality of radios; determine a second transmit power for each of the plurality of radios, wherein the second transmit power is based at least in part on a normalized average transmitted power for the respective radio over a time interval; select a third transmit power for each of the plurality of radios as a minimum of the first transmit power and the second transmit power for the respective radio; and determine the transmit power for the one or more second transmissions such that the transmit power for each of the plurality of radios is less than or equal to the third transmit power for the respective radio.

Aspect 6: The apparatus of Aspect 5, wherein the processor and the memory are further configured to: determine a fourth transmit power based at least in part on a product between a maximum average power corresponding to the RF exposure limit for the respective radio and a reciprocal of a sum of minimums of a normalized average transmitted power for the plurality of radios and unity, wherein the fourth transmit power is further based on a proportion between the normalized average transmitted power for the respective radio and a total of the normalized average transmitted powers for the plurality of radios; determine a fifth transmit power that is the maximum average power corresponding to the RF exposure limit divided by a number of the plurality of radios; and select the second transmit power based on a maximum of the fourth transmit power and the fifth transmit power.

Aspect 7: The apparatus according to Aspect 5 or 6, wherein the processor and the memory are further configured to: adjust the time interval for the normalized average transmitted power based at least in part on an average power over a time window corresponding to the RF exposure limit; and select, as the time interval, a maximum among a first time interval and a second time interval varying with average transmitted power over a past time window, wherein the first time interval and the second time interval depend on a transmission frequency of the one or more second transmissions.

Aspect 8: The apparatus according to any of Aspects 5-7, wherein the processor and the memory are further configured to adjust the time interval for the normalized average transmitted power based at least in part on one or more current network conditions.

Aspect 9: The apparatus according to any of Aspects 1-8, wherein the processor and the memory are further configured to: determine a first transmit power; apply a cap to the first transmit power to determine a second transmit power; and determine the transmit power for the one or more second transmissions such that the transmit power is less than or equal to the second transmit power.

Aspect 10: The apparatus according to any of Aspects 1-9, wherein the processor and the memory are further configured to: determine a first transmit power for the one or more second transmissions based at least in part on a time-averaged RF exposure in a past time window; determine a second transmit power based at least in part on a normalized average transmitted power for a radio over a time interval; determine a third transmit power that is a maximum average power corresponding to the RF exposure limit; select a fourth transmit power as a minimum of the first transmit power and the second transmit power for the radio; select a fifth transmit power as a minimum of the first transmit power and the third transmit power for the radio; select a sixth transmit power among the first transmit power, the fourth transmit power, and the fifth transmit power; and determine the transmit power for the one or more second transmissions such that the transmit power is less than or equal to the sixth transmit power for the radio.

Aspect 11: The apparatus according to any of Aspects 1-10, wherein the processor and the memory are further configured to: determine a first transmit power for each of a plurality of radios, wherein the first transmit power is based at least in part on a time-averaged RF exposure in a past time window; determine a second transmit power for each of the plurality of radios, wherein the second transmit power is based at least in part on a normalized average transmitted power for the respective radio over a time interval; determine a third transmit power for each of the plurality of radios, wherein the third transmit power is a maximum average power corresponding to the RF exposure limit divided by a number of the plurality of radios; select a fourth transmit power for each of the plurality of radios as a minimum of the first transmit power and the second transmit power for the respective radio; select a fifth transmit power for each of the plurality of radios as a minimum of the first transmit power and the third transmit power for the respective radio; select a sixth transmit power for each of the plurality of radios among the first transmit power, the fourth transmit power, and the fifth transmit power for the respective radio; and determine the transmit power for the one or more second transmissions such that the transmit power for each of the plurality of radios is less than or equal to the sixth transmit power for the respective radio.

Aspect 12: The apparatus according to any of Aspects 2-11, wherein the processor and the memory are further configured to: determine an overall available RF exposure margin based on a usage pattern for each radio among a plurality of radios; allocate an RF exposure margin to each of the radios based on the overall available RF exposure margin; determine a transmit power ceiling for one of the radios based on the usage pattern for each of the other radios; and determine the transmit power for the one or more second transmissions based at least in part on the transmit power ceiling and the RF exposure margin allocated to the one of the radios.

Aspect 13: The apparatus according to any of Aspects 2-12, wherein the processor and the memory are further configured to: determine a transmit power ceiling for a radio based on a usage pattern for a radio; and determine the transmit power for the one or more second transmissions based at least in part on the transmit power ceiling, wherein the transmit power ceiling is less than a maximum transmit power supported by the apparatus and greater than an average power limit associated with the RF exposure limit.

Aspect 14: The apparatus according to Aspect 12 or 13, wherein the usage pattern for each radio among the plurality of radios comprises an average transmitted power in a past time interval associated with the respective radio.

Aspect 15: The apparatus according to any of Aspects 12-14, wherein the processor and the memory are further configured to determine, as the overall available RF exposure margin, a difference of a maximum available usage and a sum of the usage patterns for the radios.

Aspect 16: The apparatus of Aspect 15, wherein the processor and the memory are further configured to: allocate a proportion of the overall available RF exposure margin to each of the radios as the RF exposure margin for the respective radio; allocate the proportion of the overall available RF exposure margin to each of the radios based at least in part on a priority associated with at least one of the radios; and determine, as the transmit power ceiling, a difference of the maximum available usage and a sum of the usage patterns for each of the other radios.

Aspect 17: The apparatus of Aspect 16, wherein at least one of a priority or the proportion of the overall available RF exposure margin is associated with at least one of a frequency band, an application, a service, a network condition, or an exposure scenario associated with the at least one of the radios.

Aspect 18: The apparatus according to any of Aspects 12-17, wherein the processor and the memory are further configured to determine the transmit power such that the transmit power is less than or equal to a minimum of the transmit power ceiling and the RF exposure margin allocated to the one of the radios.

Aspect 19: The apparatus according to any of Aspects 12-18, wherein the processor and the memory are further configured to adjust the transmit power ceiling in response to a change in the usage pattern for the radios.

Aspect 20: The apparatus according to any of Aspects 2-19, wherein the processor and the memory are further configured to: determine the application type for the one or more second transmissions; and determine the transmit power based on the application type having priority over other application types.

Aspect 21: The apparatus according to any of Aspects 1-20, wherein the processor and the memory are further configured to determine the transmit power with machine learning based at least in part on the pattern.

Aspect 22: The apparatus of Aspect 21, wherein the processor and the memory are further configured to: generate at least one of upcoming user behavior or upcoming network conditions with machine learning; and determine the transmit power based on at least one of the upcoming user behavior, current user behavior, the upcoming network conditions, or current network conditions.

Aspect 23: The apparatus according to any of Aspects 1-22, wherein the processor and the memory are further configured to: correlate the pattern to a transmit time associated with the one or more second transmissions; compare the transmit time to a time window associated with the RF exposure limit; and determine the transmit power based on the comparison.

Aspect 24: The apparatus according to any of Aspects 2-23, wherein: the transmit power pattern includes one or more transmit powers over one or more time windows associated with the RF exposure limit; the antenna usage pattern includes a usage pattern for each radio among a plurality of radios; the user behavior pattern includes one or more times associated with when a user uses the apparatus for wireless communications; the application pattern includes at least one of one or more transmit times or one or more transmit powers associated with one or more applications; the application type indicates a kind of application that generates data for transmission; the wireless network pattern includes at least one of: a channel quality between the apparatus and a receiving entity; a modulation and coding scheme (MCS) associated with the one or more first transmissions; a coding rate associated with the one or more first transmissions; a periodicity associated with the one or more first transmissions; a duty cycle associated with the one or more first transmissions; or an indication of the apparatus's mobility during the one or more first transmissions; the sensor information includes at least one of an indication of the apparatus's proximity to a non-human object, an indication that the apparatus is in free space, an indication of a user usage scenario, an indication of a usage state of the apparatus, or an indication of when antenna switching occurs at the apparatus; and the user usage scenario indicates to which portion of a user's body the apparatus is in proximity.

Aspect 25: The apparatus according to any of Aspects 1-24, wherein the RF exposure limit comprises a specific absorption rate (SAR) limit, a power density (PD) limit, or a combination thereof.

Aspect 26: A method of wireless communication by a wireless device, comprising: obtaining a pattern associated with one or more first transmissions; determining a transmit power for one or more second transmissions based at least in part on the pattern and a radio frequency (RF) exposure limit; and transmitting the one or more second transmissions at the determined transmit power.

Aspect 27: The method of Aspect 26, wherein the pattern includes at least one of: a transmit power pattern; an antenna usage pattern; a user behavior pattern; a transmission type; a priority pattern; an application pattern; an application type; a wireless network pattern; or a sensor information.

Aspect 28: The method according to Aspect 26 or 27, wherein determining the transmit power comprises: determining a first transmit power for each of a plurality of radios; determining a second transmit power for each of the plurality of radios, wherein the second transmit power is based at least in part on a normalized average transmitted power for the respective radio over a time interval; selecting a third transmit power for each of the plurality of radios as a minimum of the first transmit power and the second transmit power for the respective radio; and determining the transmit power for the one or more second transmissions such that the transmit power for each of the plurality of radios is less than or equal to the third transmit power for the respective radio.

Aspect 29: The method according to Aspect 27 or 28, wherein determining the transmit power comprises: determining an overall available RF exposure margin based on a usage pattern for each radio among a plurality of radios; allocating an RF exposure margin to each of the radios based on the overall available RF exposure margin; determining a transmit power ceiling for one of the radios based on the usage pattern for each of the other radios; and determining the transmit power for the one or more second transmissions based at least in part on the transmit power ceiling and the RF exposure margin allocated to the one of the radios.

Aspect 30: The method according to any of Aspects 27-29, wherein determining the transmit power comprises: determining a transmit power ceiling for a radio based on a usage pattern for a radio; and determining the transmit power for the one or more second transmissions based at least in part on the transmit power ceiling, wherein the transmit power ceiling is less than a maximum transmit power supported by the wireless device and greater than an average power limit associated with the RF exposure limit.

Aspect 31: An apparatus for wireless communication, comprising: a memory; and a processor coupled to the memory, the processor and the memory being configured to: obtain data for a transmission to a receiving entity and radio conditions associated with the transmission, determine a transmit time associated with the data based at least in part on the radio conditions, and transmit, to the receiving entity, a signal indicative of the data at a transmit power based at least in part on the determined transmit time and a radio frequency (RF) exposure limit.

Aspect 32: The apparatus of Aspect 31, wherein: the transmit time is selected from a plurality of transmit times associated with a plurality of transmit powers; and the plurality of transmit powers includes the transmit power at which the signal is transmitted.

Aspect 33: The apparatus of Aspect 32, wherein the plurality of transmit times comprises a first transmit time associated with an instantaneous power limit supported by the apparatus and a second transmit time associated with an average power corresponding to the RF exposure limit.

Aspect 34: The apparatus of Aspect 33, wherein: the transmit power is limited by the instantaneous power limit if the first transmit time is less than or equal to a burst transmit time associated with the instantaneous power limit in compliance with the RF exposure limit, wherein the burst transmit time is less than a time window associated with the RF exposure limit; the transmit power is limited by the average power if the second transmit time is greater than or equal to the time window associated with the RF exposure limit; and if the transmit time associated with any of the plurality of transmit powers is less than or equal to the time window, and is greater than or equal to the burst transmit time, the transmit power is less than or equal to the instantaneous power limit and greater than the average power for a first portion of the transmit time, and the transmit power is less than the average power for a second portion of the transmit time.

Aspect 35: The apparatus according to Aspect 33 or 34, wherein: the transmit power is set according to a time-average mode if the transmit time is less than or equal to a burst transmit time associated with the instantaneous power limit in compliance with the RF exposure limit, wherein the burst transmit time is less than a time window associated with the RF exposure limit; the transmit power is set according to a peak mode if the transmit time is greater than or equal to the time window associated with the RF exposure limit; and if the transmit time associated with any of the plurality of transmit powers is less than or equal to the time window and is greater than or equal to the burst transmit time, the transmit power is set according to the time-average mode such that the transmit power is less than or equal to the instantaneous power limit and greater than the average power for a first portion of the transmit time, and the transmit power is less than the average power for a second portion of the transmit time.

Aspect 36: The apparatus according to any of Aspects 31-35, wherein the radio conditions include at least one of: a channel quality between the apparatus and the receiving entity; a modulation and coding scheme (MCS) associated with the transmission; a coding rate associated with the transmission; or a periodicity associated with transmissions to the receiving entity.

Aspect 37: The apparatus according to any of Aspects 31-36, wherein the processor and the memory are further configured to: determine a data rate associated with transmitting the data to the receiving entity based on the radio conditions; and determine the transmit time based on the data rate and a size associated with the data.

Aspect 38: The apparatus according to any of Aspects 31-37, wherein the processor and the memory are further configured to determine the transmit time under mobility conditions associated with the apparatus based at least in part on future predicted radio conditions.

Aspect 39: The apparatus of Aspect 38, wherein the processor and the memory are further configured to generate the future predicted radio conditions with machine learning.

Aspect 40: The apparatus according to any of Aspects 31-39, wherein the processor and the memory are further configured to determine the transmit time based at least in part on a buffer size associated with the data.

Aspect 41: The apparatus according to any of Aspects 31-40, wherein the processor and the memory are configured to determine the radio conditions based on a pattern associated with a first time window, wherein the first time window is separate from a second time window associated with the RF exposure limit.

Aspect 42: An apparatus for wireless communication, comprising: a memory; and a processor coupled to the memory, the processor and the memory are further configured to: select a transmission mode from a plurality of transmission modes based on data for a transmission from the apparatus to a receiving entity and one or more radio conditions associated with the transmission, and transmit, to the receiving entity, a signal indicative of the data at a transmit power based at least in part on the selected transmission mode and a radio frequency (RF) exposure limit.

Aspect 43: The apparatus of Aspect 42, wherein the processor and the memory are further configured to transmit at least a portion of the data at a power level above an average power level for the RF exposure limit.

Aspect 44: The apparatus of Aspect 43, wherein the processor and the memory are configured to transmit at the power level above the average power level for the RF exposure limit during a time window associated with the RF exposure limit based on a duty cycle for the transmission.

Aspect 45: The apparatus according to Aspect 43 or 44, wherein the processor and the memory are further configured to transmit at a reserve power level, lower than the average power level, for at least a portion of a time window in which the portion of the data was transmitted.

Aspect 46: The apparatus of Aspect 45, wherein the processor and the memory are further configured to adjust the reserve power level.

Aspect 47: The apparatus according to any of Aspects 42-46, wherein: the plurality of transmission modes includes at least a first mode and a second mode, the first mode including transmissions at power levels above an average power level for the RF exposure limit and below the average power level, and the second mode including transmissions at power levels equal to or lower than the average power level; and the one or more radio conditions include at least one of: a channel quality between the apparatus and a receiving entity; a modulation and coding scheme (MCS) associated with the transmission; a coding rate associated with the transmission; or a periodicity associated with transmissions to the receiving entity.

Aspect 48: A method of wireless communication by a wireless device, comprising: obtaining data for a transmission to a receiving entity and radio conditions associated with the transmission; determining a transmit time associated with the data based at least in part on the radio conditions; and transmitting, to the receiving entity, a signal indicative of the data at a transmit power based at least in part on the determined transmit time and a radio frequency (RF) exposure limit.

Aspect 49: The method of Aspect 48, wherein: the transmit time is selected from a plurality of transmit times associated with a plurality of transmit powers; and the plurality of transmit powers includes the transmit power at which the signal is transmitted, wherein the plurality of transmit times comprises a first transmit time associated with an instantaneous power limit supported by the wireless device and a second transmit time associated with an average power corresponding to the RF exposure limit.

Aspect 50: The method of Aspect 49, wherein: the transmit power is limited by the instantaneous power limit if the first transmit time is less than or equal to a burst transmit time associated with the instantaneous power limit in compliance with the RF exposure limit, wherein the burst transmit time is less than a time window associated with the RF exposure limit; the transmit power is limited by the average power if the second transmit time is greater than or equal to the time window associated with the RF exposure limit; and if the transmit time associated with any of the plurality of transmit powers is less than or equal to the time window, and is greater than or equal to the burst transmit time, the transmit power is less than or equal to the instantaneous power limit and greater than the average power for a first portion of the transmit time, and the transmit power is less than the average power for a second portion of the transmit time.

Aspect 51: The method according to any of Aspects 49 or 50, wherein: the transmit power is set according to a time-average mode if the transmit time is less than or equal to a burst transmit time associated with the instantaneous power limit in compliance with the RF exposure limit, the burst transmit time being less than a time window associated with the RF exposure limit; the transmit power is set according to a peak mode if the transmit time is greater than or equal to the time window associated with the RF exposure limit; and if the transmit time associated with any of the plurality of transmit powers is less than or equal to the time window and is greater than or equal to the burst transmit time, the transmit power is set according to the time-average mode such that the transmit power is less than or equal to the instantaneous power limit and greater than the average power for a first portion of the transmit time, and the transmit power is less than the average power for a second portion of the transmit time.

Aspect 52: The method according to any of Aspects 48-51, wherein the radio conditions include at least one of: a channel quality between the wireless device and the receiving entity; a modulation and coding scheme (MCS) associated with the transmission; a coding rate associated with the transmission; or a periodicity associated with transmissions to the receiving entity.

Aspect 53: The method according to any of Aspects 48-52, wherein determining the transmit time comprises: determining a data rate associated with transmitting the data to the receiving entity based on the radio conditions; and determining the transmit time based on the data rate and a size associated with the data.

Aspect 54: The method according to any of Aspects 48-53, wherein determining the transmit time comprises determining the transmit time under mobility conditions associated with the wireless device based at least in part on future predicted radio conditions.

Aspect 55: The method according to any of Aspects 48-54, wherein determining the transmit time comprises determining the transmit time based at least in part on a buffer size associated with the data.

Aspect 56: A method of wireless communication by a wireless device, comprising: selecting a transmission mode from a plurality of transmission modes based on data for a transmission from the wireless device to a receiving entity and one or more radio conditions associated with the transmission; and transmitting, to the receiving entity, a signal indicative of the data at a transmit power based at least in part on the selected transmission mode and a radio frequency (RF) exposure limit.

Aspect 57: The method of Aspect 56, wherein the transmitting comprises transmitting at least a portion of the data at a power level above an average power level for the RF exposure limit.

Aspect 58: The method of Aspect 57, wherein the transmitting comprises transmitting at a reserve power level, lower than the average power level, for at least a portion of a time window in which the portion of the data was transmitted.

Aspect 59: The method of Aspect 58, wherein the transmitting comprises adjusting the reserve power level.

Aspect 60: The method according to any of Aspects 56-59, wherein: the plurality of transmission modes includes at least a first mode and a second mode, the first mode including transmissions at power levels above an average power level for the RF exposure limit and below the average power level, and the second mode including transmissions at power levels equal to or lower than the average power level; and the one or more radio conditions include at least one of: a channel quality between the wireless device and the receiving entity; a modulation and coding scheme (MCS) associated with the transmission; a coding rate associated with the transmission; or a periodicity associated with transmissions to the receiving entity.

Aspect 61: An apparatus comprising: a memory comprising executable instructions and one or more processors configured to execute the executable instructions and cause the apparatus to perform a method in accordance with any of Aspects 26-30 or 48-60.

Aspect 62: An apparatus comprising means for performing a method in accordance with any of Aspects 26-30 or 48-60.

Aspect 63: A computer-readable medium comprising executable instructions that, when executed by one or more processors of an apparatus, cause the apparatus to perform a method in accordance with any of Aspects 26-30 or 48-60.

Aspect 64: A computer program product embodied on a computer-readable storage medium comprising code for performing a method in accordance with any of Aspects 26-30 or 48-60.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smartphone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system (GPS) device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (UE) (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6, FIG. 10A, and/or FIG. 10B.

Further, it should be appreciated that modules and/or other appropriate means for performing the methods and techniques described herein can be downloaded and/or otherwise obtained by a UE and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a UE and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. An apparatus for wireless communication, comprising:
a memory; and
a processor coupled to the memory, the processor and the memory being configured to:
obtain data for a transmission to a receiving entity and radio conditions associated with the transmission,
determine a transmit time associated with the data based at least in part on the radio conditions, and
transmit, to the receiving entity, a signal indicative of the data at a transmit power based at least in part on the determined transmit time and a radio frequency (RF) exposure limit,
wherein the transmit time is selected from a plurality of transmit times associated with a plurality of transmit powers and the plurality of transmit powers includes the transmit power at which the signal is transmitted, and
wherein the plurality of transmit times comprises a first transmit time associated with an instantaneous power limit supported by the apparatus and a second transmit time associated with an average power corresponding to the RF exposure limit.

2. The apparatus of claim 1, wherein:
the transmit power is limited by the instantaneous power limit if the first transmit time is less than or equal to a burst transmit time associated with the instantaneous power limit in compliance with the RF exposure limit, wherein the burst transmit time is less than a time window associated with the RF exposure limit;
the transmit power is limited by the average power if the second transmit time is greater than or equal to the time window associated with the RF exposure limit; and
if the transmit time associated with any of the plurality of transmit powers is less than or equal to the time window, and is greater than or equal to the burst transmit time, the transmit power is less than or equal to the instantaneous power limit and greater than the average power for a first portion of the transmit time, and the transmit power is less than the average power for a second portion of the transmit time.

3. The apparatus of claim 1, wherein:
the transmit power is set according to a time-average mode if the transmit time is less than or equal to a burst transmit time associated with the instantaneous power limit in compliance with the RF exposure limit, wherein the burst transmit time is less than a time window associated with the RF exposure limit;
the transmit power is set according to a peak mode if the transmit time is greater than or equal to the time window associated with the RF exposure limit; and
if the transmit time associated with any of the plurality of transmit powers is less than or equal to the time window and is greater than or equal to the burst transmit time, the transmit power is set according to the time-average mode such that the transmit power is less than or equal to the instantaneous power limit and greater than the average power for a first portion of the transmit time, and the transmit power is less than the average power for a second portion of the transmit time.

4. The apparatus of claim 1, wherein the radio conditions include at least one of:
a channel quality between the apparatus and the receiving entity;
a modulation and coding scheme (MCS) associated with the transmission;
a coding rate associated with the transmission; or
a periodicity associated with transmissions to the receiving entity.

5. The apparatus of claim 1, wherein the processor and the memory are further configured to:
determine a data rate associated with transmitting the data to the receiving entity based on the radio conditions; and
determine the transmit time based on the data rate and a size associated with the data.

6. The apparatus of claim 1, wherein the processor and the memory are further configured to determine the transmit time under mobility conditions associated with the apparatus based at least in part on future predicted radio conditions.

7. The apparatus of claim 6, wherein the processor and the memory are further configured to generate the future predicted radio conditions with machine learning.

8. The apparatus of claim 1, wherein the processor and the memory are further configured to determine the transmit time based at least in part on a buffer size associated with the data.

9. The apparatus of claim 1, wherein the processor and the memory are configured to determine the radio conditions based on a pattern associated with a first time window, wherein the first time window is separate from a second time window associated with the RF exposure limit.

10. A method of wireless communication by a wireless device, comprising:
obtaining data for a transmission to a receiving entity and radio conditions associated with the transmission;
determining a transmit time associated with the data based at least in part on the radio conditions; and
transmitting, to the receiving entity, a signal indicative of the data at a transmit power based at least in part on the determined transmit time and a radio frequency (RF) exposure limit,
wherein the transmit time is selected from a plurality of transmit times associated with a plurality of transmit powers and the plurality of transmit powers includes the transmit power at which the signal is transmitted, and
wherein the plurality of transmit times comprises a first transmit time associated with an instantaneous power limit supported by the wireless device and a second transmit time associated with an average power corresponding to the RF exposure limit.

11. The method of claim 10, wherein:
the transmit power is limited by the instantaneous power limit if the first transmit time is less than or equal to a burst transmit time associated with the instantaneous power limit in compliance with the RF exposure limit, wherein the burst transmit time is less than a time window associated with the RF exposure limit;
the transmit power is limited by the average power if the second transmit time is greater than or equal to the time window associated with the RF exposure limit; and
if the transmit time associated with any of the plurality of transmit powers is less than or equal to the time window, and is greater than or equal to the burst transmit time, the transmit power is less than or equal to the instantaneous power limit and greater than the average power for a first portion of the transmit time, and the transmit power is less than the average power for a second portion of the transmit time.

12. The method of claim 10, wherein:
the transmit power is set according to a time-average mode if the transmit time is less than or equal to a burst transmit time associated with the instantaneous power limit in compliance with the RF exposure limit, the burst transmit time being less than a time window associated with the RF exposure limit;
the transmit power is set according to a peak mode if the transmit time is greater than or equal to the time window associated with the RF exposure limit; and
if the transmit time associated with any of the plurality of transmit powers is less than or equal to the time window and is greater than or equal to the burst transmit time, the transmit power is set according to the time-average mode such that the transmit power is less than or equal to the instantaneous power limit and greater than the average power for a first portion of the transmit time, and the transmit power is less than the average power for a second portion of the transmit time.

13. The method of claim 10, wherein the radio conditions include at least one of:
a channel quality between the wireless device and the receiving entity;
a modulation and coding scheme (MCS) associated with the transmission;

a coding rate associated with the transmission; or
a periodicity associated with transmissions to the receiving entity.

14. The method of claim 10, wherein determining the transmit time comprises:
   determining a data rate associated with transmitting the data to the receiving entity based on the radio conditions; and
   determining the transmit time based on the data rate and a size associated with the data.

15. The method of claim 10, wherein determining the transmit time comprises determining the transmit time under mobility conditions associated with the wireless device based at least in part on future predicted radio conditions.

16. The method of claim 10, wherein determining the transmit time comprises determining the transmit time based at least in part on a buffer size associated with the data.

* * * * *